United States Patent
Miki et al.

(10) Patent No.: US 8,889,080 B2
(45) Date of Patent: Nov. 18, 2014

(54) NEAR-FIELD LIGHT MICROCHANNEL STRUCTURE AND NEAR-FIELD LIGHT MICROREACTOR

(75) Inventors: Kazushi Miki, Tsukuba (JP); Katsuhiro Isozaki, Tsukuba (JP); Takao Ochiai, Tsukuba (JP); Tomoya Taguchi, Tsukuba (JP); Kohichi Nittoh, Tsukuba (JP)

(73) Assignee: National Institute for Materials Science, Ibaraki (JP)

( * ) Notice: Subject to any disclaimer, the term of this patent is extended or adjusted under 35 U.S.C. 154(b) by 221 days.

(21) Appl. No.: 13/643,687

(22) PCT Filed: Mar. 3, 2011

(86) PCT No.: PCT/JP2011/054964
§ 371 (c)(1),
(2), (4) Date: Jan. 4, 2013

(87) PCT Pub. No.: WO2011/135923
PCT Pub. Date: Nov. 3, 2011

(65) Prior Publication Data
US 2013/0095005 A1    Apr. 18, 2013

(30) Foreign Application Priority Data
Apr. 27, 2010 (JP) .................................. 2010-101985

(51) Int. Cl.
*B01J 19/08* (2006.01)
(52) U.S. Cl.
USPC .................................................... 422/186.3
(58) Field of Classification Search
USPC ..................................................... 422/186.3
See application file for complete search history.

(56) References Cited

U.S. PATENT DOCUMENTS

2007/0212806 A1* 9/2007 Ito ................................... 438/99
2008/0107371 A1* 5/2008 Todori et al. ...................... 385/2

FOREIGN PATENT DOCUMENTS

JP    2006-250668    *  9/2006

OTHER PUBLICATIONS

International Search Report issued May 10, 2011 in corresponding International Application No. PCT/JP2011/054964.
Takao Ochiai et al., "Fabrication of Self-Assembled Monolayer of Gold Nanoparticles using Electrophoresis Method", Extended Abstracts, Japan Society of Applied Physics and Related Societies, Mar. 3, 2010, p. 03-225, No. 18a-P4-28.
Tomoya Taguchi et al., "Highly Efficient Photochemical Reaction at the surface of Self-Assembled Monolayer of Gold Nanoparticles", Extended Abstracts, Japan Society of Applied Physics and Related Societies, Mar. 3, 2010, p. 21-046, No. 18p-ZE-7.

* cited by examiner

*Primary Examiner* — Kishor Mayekar
(74) *Attorney, Agent, or Firm* — Wenderoth, Lind & Ponack, L.L.P.

(57) ABSTRACT

The object can be attained by the near-field light microchannel structure 61 that comprises a structure 95 provided with a microchannel 41c and a near-field light two-dimensional array 50 arranged inside the microchannel 41c and enabling in-plane near-field light generating, in which the near-field light two-dimensional array 50 comprises an electroconductive layer 6 formed on the inner wall surface of the microchannel 41c, a immobilizing layer 2 immobilized on one surface 6a of the electroconductive layer 6 via chemical bonding, and metal nanoparticle arrays 3 immobilized on one surface 2a of the immobilizing layer 2 via chemical bonding, and in which the metal nanoparticle arrays 3 each comprise multiple metal nanoparticles 4 arrayed at regular intervals and bonded to each other via the modifying part 5 arranged on the surface thereof.

22 Claims, 25 Drawing Sheets (a)  (b)

| Fluid Area : 0.32 (cm²) | | | |
|---|---|---|---|
| Width (μm) | 90 | 30 | 10 |
| Line Number | 9 | 27 | 81 |

Flow Path Length (cm): 4.0

Flow Path Thickness (μm): 1.0, 3.0, 9.0, 27.0

NEAR-FIELD LIGHT MICROCHANNEL STRUCTURE AND NEAR-FIELD LIGHT MICROREACTOR

The present application is a U.S. National Stage of International Application No. PCT/JP2011/054964, filed Mar. 3, 2011.

TECHNICAL FIELD

The present invention relates to a near-field light microchannel structure and a near-field light microreactor.

BACKGROUND ART

Heretofore, for near-field light, a type of point light source for light generation through a hole having a size of not more than the light wavelength as formed at the tip of a metal-coated optical fiber has been energetically studied and developed to support the development of techniques of immersion lithography and near-field microscopy.

Regarding near-field light sources, however, only those of a nanoscale size could be realized in principle, and though the possibility of their application to photochemical reaction with near-field light has been latently suggested, it could not as yet reach realistic application.

For example, Non-Patent Reference 19 describes a case where a light aperture Br having a size of not more than the wavelength of light is formed at the tip FP of an optical fiber coated with a metal Mt, the light Lt having propagated through the core layer Wg of the optical fiber leaks out (as a near-field light), and the near-field light triggers vapor decomposition of two-photon reaction to produce a nanostructure of zinc, as shown in FIG. 24.

Non-Patent Reference 20 describes a case where gold blocks of 100 nm×100 nm are two-dimensionally arrayed via a gap distance of not more than 10 nm to form a gold nanoblock two-dimensional array structure through electron beam lithography, as shown in FIG. 25, and the gold blocks are made to generate near-field light by the use of an external polarized light source to thereby realize a region in which the near-field light is enhanced only in the light polarization direction.

In these cases, two-photon reaction or three-photon reaction is surely verified by the use of a strong near-field light. However, these cases have some drawbacks in that (1) special probe technique or electron beam lithography is employed and therefore the cases are inconvenient in point of the cost and the apparatus operation, (2) in measurement, a scanning probe microscope or the like is needed, and the cases are inconvenient in point of the cost and the apparatus operation, (3) chemical reaction in solution is usual, but in these cases, the reaction is in vapor or is attained by the use of a solid system and the product is solid, and therefore the cases lack versatility, and (3) the product is a nano-scale solid and therefore could not be identified through quantitative analysis such as NMR, etc.

Metal nanoparticles having a particle size of from 1 to 100 nm can generate localized light (hereinafter referred to as near-field light) having a size corresponding to the radius thereof. Whilst ordinary light propagates in air, near-field light propagates along the surface of scatterer such as metal nanoparticles, etc. Accordingly, a metal nanoparticle array structure comprising two-dimensionally arrayed metal nanoarrays formed on a substrate in which the distance between the metal nanoparticles is from 1 to 10 nm can generate a large electric field or an extremely bright near-field light in the gap between the metal nanoparticles. With that, the metal nanoparticle array structure of the type can be utilized as a near-field light two-dimensional array.

As a reaction light source in a microreactor, it may be considered to use a near-field light two-dimensional array that comprises a metal nanoparticle array structure.

Microreactor is an apparatus for generating chemical reaction in a microchannel having a micron-scale space. As compared with any other apparatus where chemical reaction is carried out in a space having a larger scale, the microreactor is excellent in point of the energy efficiency, the reaction speed, the yield, the safety, the scale-up performance, the experiment space, the reaction substrate mixing performance, and the control performance for experiment conditions such as reaction temperature, etc. Microreactor is much used for reaction in a liquid phase and a vapor phase, and there are reports of a combined case with a thin-film photocatalyst or the like. Another advantage of microreactor is that scaling up is easy by increasing the number of the microchannels therein.

When a metal nanoparticle array is arranged in the flow path in such a microreactor, then near-field photoreaction can be realized efficiently on the surface of the metal nanoparticle array and therearound. In other words, near-field photoreaction can be carried out in the microchannel having a micron-scale space, and the probability that the reaction substrate could reach the surface of the metal nanoparticle array can be increased than in the near-field photoreaction in a space having a larger scale, and the reaction efficiency can be thereby enhanced. Taking the diffusion distance between the starting material for photoreaction and the photoreaction product into consideration, nearly 100% near-field photoreaction can be realized in the microchannel having a micron-scale space.

Actually, however, a method of efficiently generating photoreaction by the use of a near-field light in a microreactor is not realized.

For using a metal nanoparticle array structure as the light source of such a near-field light, the size and the shape of the metal nanoparticles and also the distance between them must be uniformly controlled, which, however, is difficult.

Some reports have already been made relating to the technique of producing a metal nanoparticle array structure. For example, nanosphere lithography (Non-Patent References 1 to 3) and electron beam lithography (Non-Patent Reference 4) are already-existing techniques, which, however, have some problems in that the lithography apparatus is expensive and a large-scale structure is difficult to produce.

Regarding the technique of note for fixation on a substrate such as chemical bonding or the like, there are known a thiol bond (Non-Patent References 14 to 15), a CN bond (Non-Patent Reference 16), and a coordination bond (Non-Patent References 17 to 18). According to these methods, however, a metal nanoparticle array structure having a high coverage is not obtained.

Production according to a self-organizing method has been tried. As a method of using an external pressure, there are known a Langmuir method (Non-Patent References 5 to 8), a Langmuir-Blodgett method (Non-Patent References 9 to 10), a dip coating method (Non-Patent Reference 11), use of solid-liquid interface (Patent Reference 1). As a method of using an external field, there are known an electrophoresis method (Non-Patent Reference 13, Patent Reference 3), and a solvent evaporation method (Non-Patent Reference 12, Patent Reference 2).

However, these methods do not have any strong immobilizing means such as chemical bonding or the like between the metal nanoparticle array structure and the immobilizing substrate, and are therefore problematic in that, when the structure is arranged in a microchannel, the metal nanoparticles would readily peel away from the immobilizing substrate as exposed to the solution or the like running through the flow path.

CITATION LIST

Patent Reference 1: JP-A 2006-192398
Patent Reference 2: JP-A 2007-313642
Patent Reference 3: JP-A 2009-6311
Non-Patent Reference 1: Wang, W.; Wang, Y.; Dai, Z.; Sun, Y.; Sun, Y. Appl. Surface Sci. 2007, 253, 4673-4676.
Non-Patent Reference 2: Shen, H.; Cheng, B.; Lu, G.; Ning, T.; Guan, D.; Zhou, Y.; Chen, Z., Nanotechnology, 2006, 17, 4274-4277.
Non-Patent Reference 3: Tan, B. J. Y.; Sow, C. H.; Koh, T. S.; Chin, K. C.; Wee, A. T. S.; Ong, C. K., J. Phys. Chem. B 2005, 109, 11100-11109.
Non-Patent Reference 4: Felidj, N.; Aubard, J.; Levi, G. Appl. Phys. Chem. 2003, 82, 3095-3097.
Non-Patent Reference 5: Liao, J; Agustsson, J. S.; Wu, S.; Schoenenberger, C.; Calame, M.; Leroux, Y.; Mayor, M.; Jeannin, O.; Ran, Y. -F.; Liu, S. -X.; Decurtins, S. Nano Lett. 2010, 10, 759-764.
Non-Patent Reference 6: Chiang, Y, -L; Chen, C. -W; Wang, C. -H.; Hsein, C. -Y; Chen, Y. -T; Appl. Phys. Lett., 2010, 96, 041904-1-041904-4.
Non-Patent Reference 7: Kim, B.; Tripp, S. L.; Wei, A. J. Am. Chem. Soc. 2001, 123, 7955-7956.
Non-Patent Reference 8: Kim, B.; Sadtler, B.; Tripp, S. L. Chem. Phys. Chem., 2001, 12, 743-745.
Non-Patent Reference 9: Park, Y. -K.; Yoo, S. -H.; Park, S. Langmuir, 2008, 24, 4370-4375.
Non-Patent Reference 10: Brown, J. J.; Porter, J. A.; Daghlian, C. P.; Gibson, U. J. Langmuir, 2001, 17, 7966-7969.
Non-Patent Reference 11: Dai, C. -A.; Wu, Y. -L.; Lee, Y. -H.; Chang, C. -J.; Su, W. -F. J. Cryst. Growth, 2006, 288, 128-136.
Non-Patent Reference 12: Wang, H.; Levin, C. S.; Halas, N. J. J. Am. Chem. Soc., 2005, 127, 14992-14993.
Non-Patent Reference 13: Peng, Z.; Qu, X.; Dong, S. Langmuir, 2004, 20, 5-10.
Non-Patent Reference 14: Kaminska, A.; Inya-Agha, O.; Forster, R. J.; Keyes, T. E. Phys. Chem. Chem. Phys., 2008, 10, 4172-4180.
Non-Patent Reference 15: Grabar, K. C.; Smith, P. C.; Musick, M. D.; Davis, J. A.; Walter, D. G.; Jackson, M. A.; Guthrie, A. P.; Natan, M. J. J. Am. Chem. Soc., 1996, 118, 1148-1153.
Non-Patent Reference 16: Chan, E. W. L.; Yu, L. Langmuir, 2002, 18, 311-313.
Non-Patent Reference 17: Wanunu, M.; Popovitz-Biro, R.; Cohen, H.; Vaskevich, A.; Rubinstein, I. J. Am. Chem. Soc., 2005, 127, 9207-9215.
Non-Patent Reference 18: Zamborini, F. P.; Hicks, J. F.; Murray, R. W. J. Am. Chem. Soc. 2000, 122, 4514-4515.
Non-Patent Reference 19: T. Kawazoe, et al., Appl. Phys. Lett. 2001, 79, 1184.
Non-Patent Reference 20: K. Ueno et al., J. Am. Chem. Soc., 2008, 130, 6928.
Non-Patent Reference 21: Hartling, T.; Alaverdyan, Y.; Hille, A; Wenzel, M. T.; Kall, L. M., Optics. Express, 2008, 16, 12362-12371.

SUMMARY OF INVENTION

Problems that the Invention is to Solve

An object of the invention is to provide a near-field light microchannel structure and a near-field light microreactor provided with a near-field light two-dimensional array that comprises metal nanoparticles firmly bonded to the wall surface inside the microchannel.

Means for Solving the Problems

The near-field light microchannel structure of the invention comprises a structure provided with a microchannel and a near-field light two-dimensional array arranged inside the microchannel and enabling in-plane near-field light generating, in which the near-field light two-dimensional array comprises an electroconductive layer formed on the inner wall surface of the microchannel, a immobilizing layer immobilized on one surface of the electroconductive layer via chemical bonding, and metal nanoparticle arrays immobilized on one surface of the immobilizing layer via chemical bonding, and in which the metal nanoparticle arrays each comprise multiple metal nanoparticles arrayed at regular intervals and bonded to each other via the modifying part arranged on the surface thereof.

In the near-field light microchannel structure of the invention, the structure has a first member and a second member laminated on one side of the first member, and the microchannel is arranged between the first member and the second member.

In the near-field light microchannel structure of the invention, the distance between the metal nanoparticles is from 1 to 10 nm.

In the near-field light microchannel structure of the invention, the particle size of the metal nanoparticles is from 1 to 100 nm.

In the near-field light microchannel structure of the invention, the metal nanoparticles are formed of gold.

In the near-field light microchannel structure of the invention, the modifying part is an organic molecule having a thiol group, and the thiol group is bonded to the metal nanoparticles.

In the near-field light microchannel structure of the invention, the organic molecule of the modifying part has an alkyl chain with from 6 to 20 carbon atoms.

In the near-field light microchannel structure of the invention, the immobilizing layer comprises an organic molecule having at least two thiol groups, at least one thiol group is arranged on both one surface and the other surface of the immobilizing layer, and the thiol group on the other surface is bonded to the electroconductive layer.

In the near-field light microchannel structure of the invention, the organic molecule to constitute the immobilizing layer has an alkyl chain with from 6 to 20 carbon atoms.

In the near-field light microchannel structure of the invention, the microchannel is formed to have a bended part or a folded part or both the two.

In the near-field light microchannel structure of the invention, multiple microchannels are arranged.

In the near-field light microchannel structure of the invention, a first hole to pass to the microchannel is formed in the surface.

In the near-field light microchannel structure of the invention, a second hole to pass to the microchannel is formed in the surface.

In the near-field light microchannel structure of the invention, a third hole to pass to the microchannel is formed in the first member.

In the near-field light microchannel structure of the invention, the third hole communicates with another microchannel arranged between the third member laminated on the other surface of the first member, and the first member.

In the near-field light microchannel structure of the invention, a fourth hole to pass to the other microchannel is formed in the surface.

In the near-field light microchannel structure of the invention, at least two first holes are formed in the surface, and a first microchannel to linearly connect any one of the first holes and the second hole, and a branched microchannel as branched from the first microchannel via a joint part and passing to each of the remaining first holes are arranged.

In the near-field light microchannel structure of the invention, two or more branched microchannels are formed, and the near-field light two-dimensional array is arranged on the side of the second hole opposite to any joint part of the branched microchannels.

In the near-field light microchannel structure of the invention, two or more branched microchannels are formed, and the near-field light two-dimensional array is arranged between the joint parts of the adjacent branched microchannels.

The near-field light microreactor of the invention comprises the above-mentioned near-field light microchannel structure, a reaction solution supply for feeding a reaction solution to the microchannel, a pump for sucking a reaction solution in the microchannel, and a light source for photoirradiating the near-field light two-dimensional array in the microchannel.

In the near-field light microreactor of the invention, the reaction solution supply is connected to the first hole.

In the near-field light microreactor of the invention, the pump is connected to the second hole or the fourth hole.

Advantage of the Invention

The near-field light microchannel structure of the invention comprises a structure provided with a microchannel and a near-field light two-dimensional array arranged inside the microchannel and enabling in-plane near-field light generating, in which the near-field light two-dimensional array comprises an electroconductive layer formed on the inner wall surface of the microchannel, a immobilizing layer immobilized on one surface of the electroconductive layer via chemical bonding, and metal nanoparticle arrays immobilized on one surface of the immobilizing layer via chemical bonding, and in which the metal nanoparticle arrays each comprise multiple metal nanoparticles arrayed at regular intervals and bonded to each other via the modifying part arranged on the surface thereof. Consequently, the invention can provide the near-field light microchannel structure and the near-field light microreactor provided with a near-field light two-dimensional array in which metal nanoparticles are firmly bonded to the inner wall surface of the microchannel therein. In the microreactor of the invention having the configuration as above, therefore, the possibility that the reaction substrate can exist around the near-field light two-dimensional array inside the near-field light microchannel is high, as compared with that in a large-capacity reactor; and therefore in the microreactor of the invention, various types of photochemical reaction can be promoted extremely efficiently.

The near-field light microreactor of the invention comprises the above-mentioned near-field light microchannel structure, a reaction liquid supply connected to the first hole, a pump connected to the second hole, and a light source for photoirradiating the near-field light two-dimensional array in the microchannel. Consequently, the invention can provide the near-field light microchannel structure and the near-field light microreactor provided with a near-field light two-dimensional array in which metal nanoparticles are firmly bonded to the inner wall surface of the microchannel therein. In the near-field light microreactor of the invention having the configuration as above, therefore, a large-volume reaction product can be obtained owing to the continuous inflow and outflow of the reaction solution by the action of the pump. In addition, since multiple reaction substrate solutions can be introduced into the microreactor, different types of chemical reaction or photochemical reaction can be attained continuously to give a multi-stage synthetic product in one step.

BRIEF DESCRIPTION OF THE DRAWINGS

FIG. 1($a$) is a perspective view; and FIG. 1($b$) is a vertical cross-sectional view.

FIG. 2($a$) is a perspective view; and FIG. 2($b$) is a vertical cross-sectional view.

FIG. 3($a$) is a perspective view; and FIG. 3($b$) is a vertical cross-sectional view.

FIG. 6($a$) is an enlarged view of the part E in FIG. 4; and FIG. 6($b$) is a cross-sectional view through the line F-F' in FIG. 4. These show conceptually the near-field light generating region from the metal nanoparticles.

FIG. 9($a$) is a perspective view; and FIG. 9($b$) is a vertical cross-sectional view.

FIG. 11($a$) is a partly-cut perspective view; and FIG. 11($b$) is a vertical cross-sectional view of the near-field light microchannel structure to be used in the near-field light microreactor.

FIG. 12($a$) is a perspective view; FIG. 12($b$) is a plan view; and FIG. 12($c$) is a vertical cross-sectional view.

FIG. 13($a$) is a perspective view; FIG. 13($b$) is a plan view; and FIG. 13($c$) is a vertical cross-sectional view.

FIG. 23 is a table showing the framework condition of the microchannel of a near-field light microchannel structure.

DESCRIPTION OF REFERENCE NUMERALS AND SIGNS

1 Substrate
1a One Surface
2 Immobilizing Layer
2a One Surface
3 Metal Nanoparticle Array
4 Metal Nanoparticle
5 Modifying Part
6 Electroconductive Layer
8 Domain
21 Solvent
22 Reaction Liquid
22a Liquid Level
23 Liquid Tank
24 Lid
24c Hole
25, 26 Electrode
27 Wiring
28 Power Source
29 Air-Liquid Interface
30 Production Apparatus
41 Second Member
41a First Hole
41b Second Hole
41c Microchannel
41i One Surface
41g Recess
42 Second Member
42a First Hole
42b Second Hole
42c1, 42c2, 42c3, 42c4, 42c5, 42c6, 42c7, 42c8, 42c9 Microchannel
42j Bended Part
43 Second Member
43a First Hole
43b Fourth Hole
43c Microchannel
44 Second Member
44a1, 44a2, 44a3 First Hole
44b Second Hole
44c1 First Microchannel
44c2, 44c3 Branched Microchannel
44d1 First Joint Part
44d2 Second Joint Part
44i One Surface
51 First Member
51a One Surface
51b Other Surface
50 Near-Field Light Two-Dimensional Array
53 First Member
53a One Surface
53b Other Surface
53c, 53d Third Hole
53e Hole
61, 63, 64, 65 Near-field light Microchannel Structure
71 Near-field light Microreactor
81 Reaction Solution Supply
82 Light Source
83 Pump
84, 85 Connecting Tube
93 Third Member
93c Microchannel
95 Structure
Fm Particle Size
Gm Distance between Metal Nanoparticles (gap distance)
Lm Distance between the Centers of Adjacent Metal Nanoparticles (particle-to-particle distance)
O Center
Ls Distance from the Center of Metal Nanoparticle to One Surface of Substrate (particle-to-substrate distance)
Gs Thickness of Immobilizing Layer
NF, NFO2, NFO3 Near-Field Light
Z Flow Path Direction
LSR Irradiation Direction

MODE FOR CARRYING OUT THE INVENTION

First Embodiment of the Invention

A near-field light microchannel structure of the first embodiment of the invention is described with reference to the attached drawings.

Figure 1:
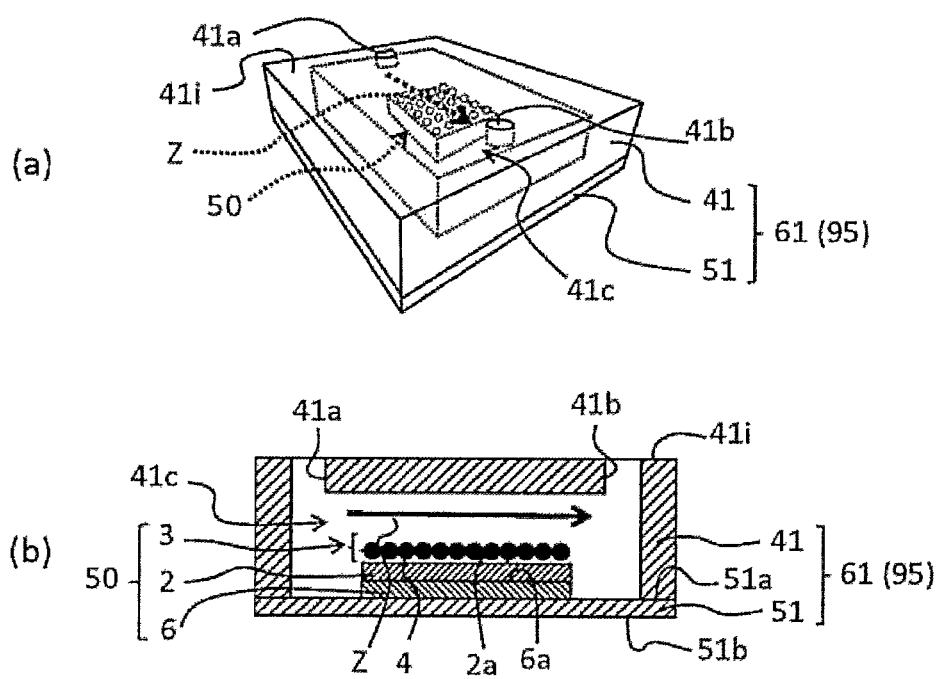
FIG. 1 shows one example of the near-field light microchannel structure of an embodiment of the invention.

FIG. 1 shows one example of the near-field light microchannel structure 61 of the first embodiment of the invention. FIG. 1(a) is a perspective view; and FIG. 1(b) is a vertical cross-sectional view.

As shown in FIG. 1, the near-field light microchannel structure 61 of the first embodiment of the invention comprises a structure 95 provided with a microchannel 41c and a near-field light two-dimensional array 50 arranged inside the microchannel 41c and enabling in-plane near-field light generating.

The structure 95 comprises the first member 51 and the second member 41 laminated on the side of one surface 51a of the first member 51. The microchannel 41c is arranged between the first member 51 and the second member 41.

Figure 2:
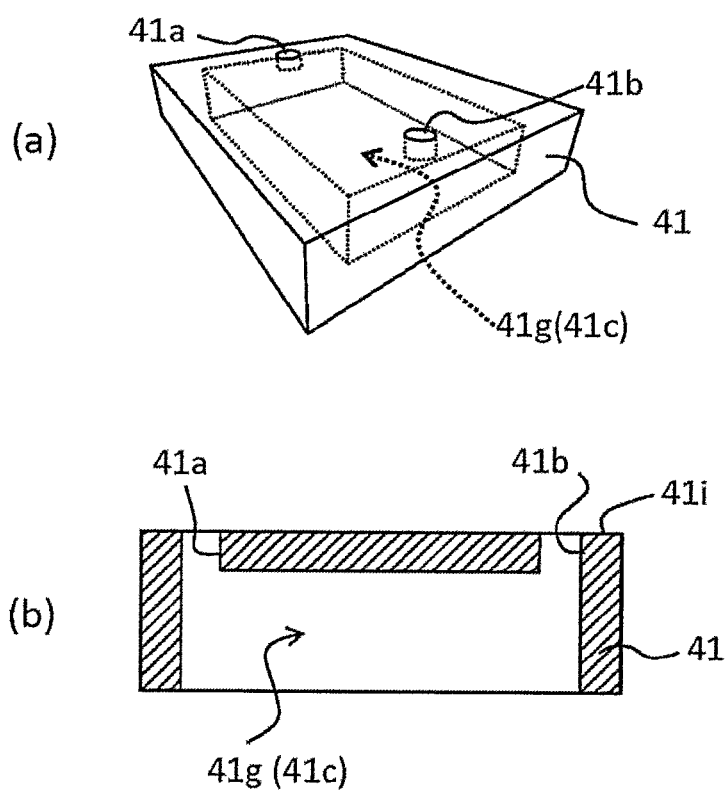
FIG. 2 shows the second member.

FIG. 2 shows the second member 41. FIG. 2(a) is a perspective view; and FIG. 2(b) is a vertical cross-sectional view.

The first hole 41a and the second hole 41b are formed in one surface 41i. On the side of the other surface, arranged is the recess 41g for microchannel.

Figure 3:
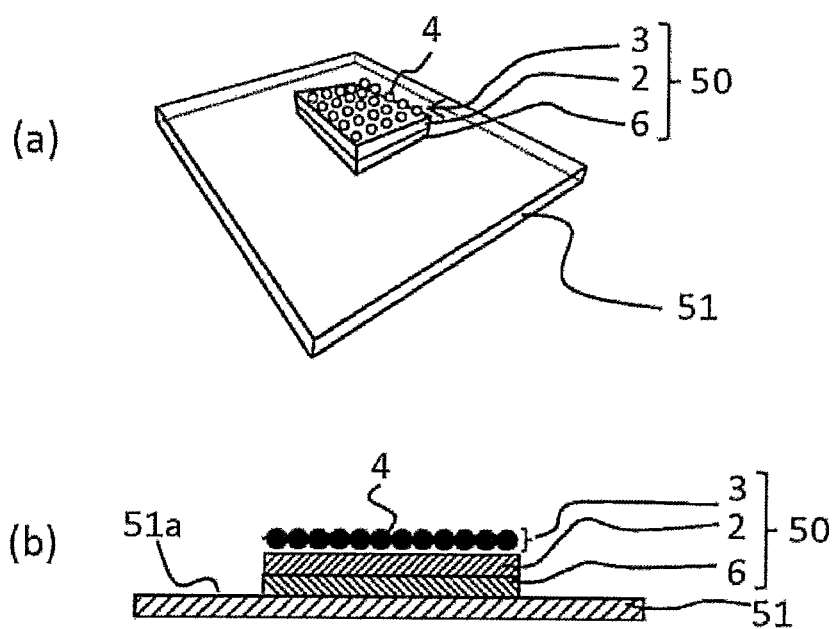
FIG. 3 shows the first member.

FIG. 3 shows the first member 51. FIG. 3(a) is a perspective view; and FIG. 3(b) is a vertical cross-sectional view.

On one surface 51a of the first member 51, laminated are the electroconductive layer 6, the immobilizing layer 2 and the metal nanoparticle array 3 of arrayed metal nanoparticles 4. The electroconductive layer 6, the immobilizing layer 2 and the metal nanoparticle arrays 3 form the near-field light two-dimensional array 50.

The near-field light two-dimensional array 50 is formed in the center part of one surface 51a of the first member 51, but is not in the peripheral part thereof. The near-field light two-dimensional array 50 is set in the recess 41g, and the peripheral part is bonded to the upper member to thereby bond one surface 51a of the first member 51 to the other side of the second member 41, and consequently, the recess 41g becomes the microchannel 41c to construct the near-field light microchannel structure 61.

As shown in FIG. 1 and FIG. 2, the first hole 41a and the second hole 41b both passing to the microchannel 41c are formed in one surface 41i of the second member 41. For example, the illustration is so configured that a reaction solution could run through the microchannel in the direction of the arrow Z (flow path direction).

One microchannel 41c is formed linearly. However, the invention is not limited to the case. The microchannel 41c may be formed to have a bended part or a folded part or both the two.

Multiple microchannels 41c may be provided.

The microchannel 41c may have a branched configuration.

Further, as shown in FIG. 1, the cross section vertical to the flow path direction Z of the microchannel 41c is nearly rectangular. However, not limited to the case, for example, the cross section may also be nearly circular.

The shape of the microchannel 41c may be defined in consideration of the type of the chemical reaction to be attained in the microreactor.

The width of the microchannel 41c is a parameter to define the area of the near-field light part and the pump pressure necessary for making the reaction solution run through the microchannel. The height of the microchannel 41c is a parameter to define as to whether the diffusion distance of the chemical reaction starting material and the reaction product from the near-field light part and to the near-field light part could be relatively large or small.

The fluid in the microchannel in the microreactor is divided into a layer part and an ordinary fluid part, and the values vary depending on the channel material, the channel material surface treatment and the fluid.

The ratio of the layer part and the ordinary fluid part is smaller when the flow path width is larger. For the diffusion distance of the chemical reaction starting material and the reaction product to the near-field light part, both the diffusion between the layer part and the ordinary fluid part and the diffusion in the layer part are taken into consideration. The former may occur enough by sufficiently providing the length of the microchannel 41c, and could be therefore ignorable. For the latter value, the reaction in an ordinary solution may be referred to, and the length of the microchannel 41c can be defined so as to fully secure the diffusion.

Further, the length of the microchannel 41c can be one parameter to define as to how much the chemical reaction could occur depending on the photoirradiation time.

The material of the second member 41 is preferably resin, quartz or the like. This is because the material may form the microchannel 41c having any desired shape in a limited area by the in-printing method and the like. Depending on the solvent to be used in photochemical reaction and in consideration of the chemical resistance thereof, the material of the second member 41 is defined.

As shown in FIG. 1, the first hole 41a and the second hole 41b both passing to the microchannel 41c are formed in one surface 41i of the second member 41. However, the number of the first hole 41a is not limited to one. Here, the first hole 41a and the second hole 41b are formed in one surface 41i; however, the invention is not limited to the case. The holes may be formed in any other surface.

Inside the microchannel 41c, arranged is the near-field light two-dimensional array 50. The near-field light two-dimensional array 50 comprises the electroconductive layer 6 formed on the inner wall surface of the microchannel 41c and on one surface 51a of the first member 51, the immobilizing layer 2 immobilized on one surface 6a of the electroconductive layer 6 via chemical bonding, and the metal nanoparticle arrays 3 immobilized on one surface 2a of the immobilizing layer 2 via chemical bonding.

As shown in FIG. 1 and FIG. 3, the electroconductive layer 6, the immobilizing layer 2 and the metal nanoparticle arrays 3 of arrayed metal nanoparticles 4 are laminated on one surface 51a of the first member 51.

The metal nanoparticle array 3 is composed of metal nanoparticles 4 arrayed at regular intervals. The metal nanoparticles 4 are bonded to each other via the modifying part 5 formed on the surface thereof. The regularly arrayed metal nanoparticle arrays 3 express the effect as the near-field light two-dimensional array 50.

The material of the first member 51 is preferably a sapphire substrate, a quartz substrate, a glass substrate or the like. This is because the near-field light two-dimensional array can be formed at high coverage and at high density on the surface of the material, and the material can be bonded to the second member 41 with high adhesiveness.

Figure 4:
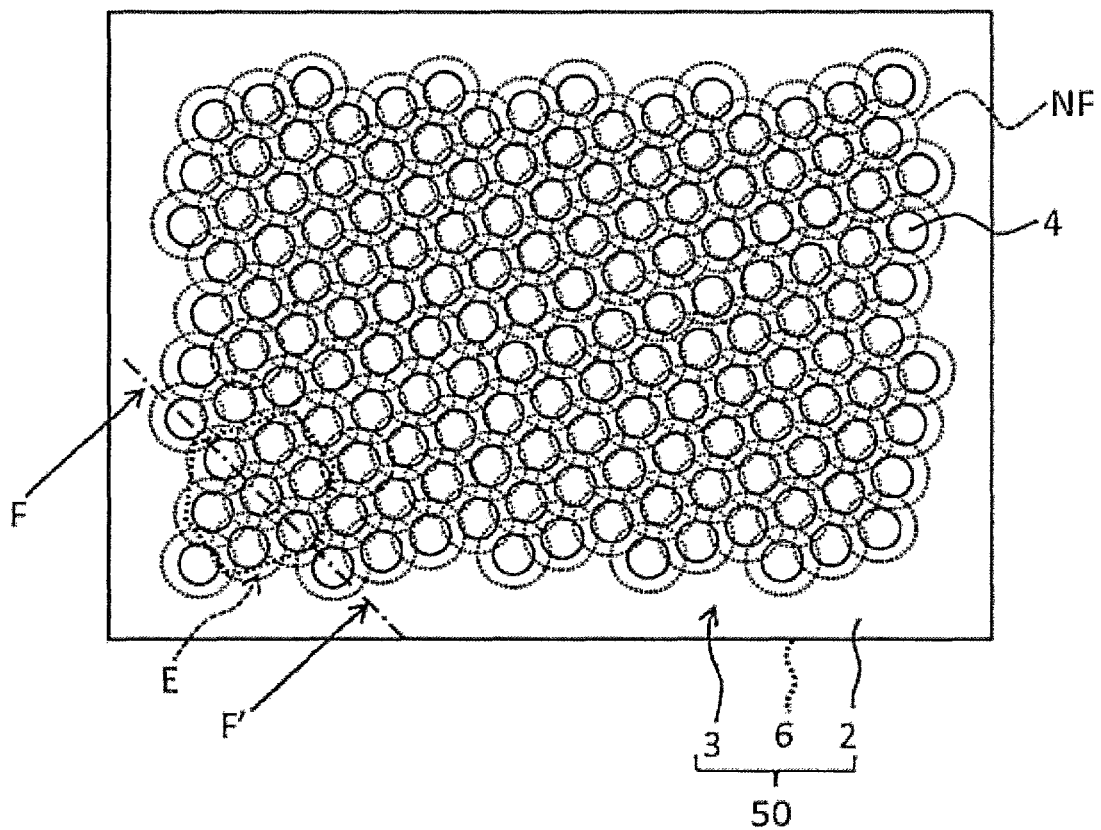
FIG. 4 is an enlarged plane view showing one example of metal nanoparticle arrays. This shows conceptually the near-field light generating region from the metal nanoparticles.

FIG. 4 is an enlarged plane view showing one example of the metal nanoparticle array 3. This shows conceptually the near-field light NF from the metal nanoparticles 4.

As shown in FIG. 4, the metal nanoparticle array 3 is an array unified in the entire surface of the immobilizing layer 2. The near-field light NF is regularly formed around each metal nanoparticle 4, and therefore the array can uniformly generate the near-field light in the plane.

More concretely, when the metal nanoparticle arrays of metal nanoparticles having a size of from 1 to 100 nm are irradiated with a light having a suitable wavelength distribution, then the near-field light NF is generated around the surfaces of the metal nanoparticles serving as scatterers.

The size of the near-field light NF is known to be around the diameter of the metal nanoparticle.

The metal nanoparticle arrays 3 are not limited to such ideal arrays.

Figure 5:
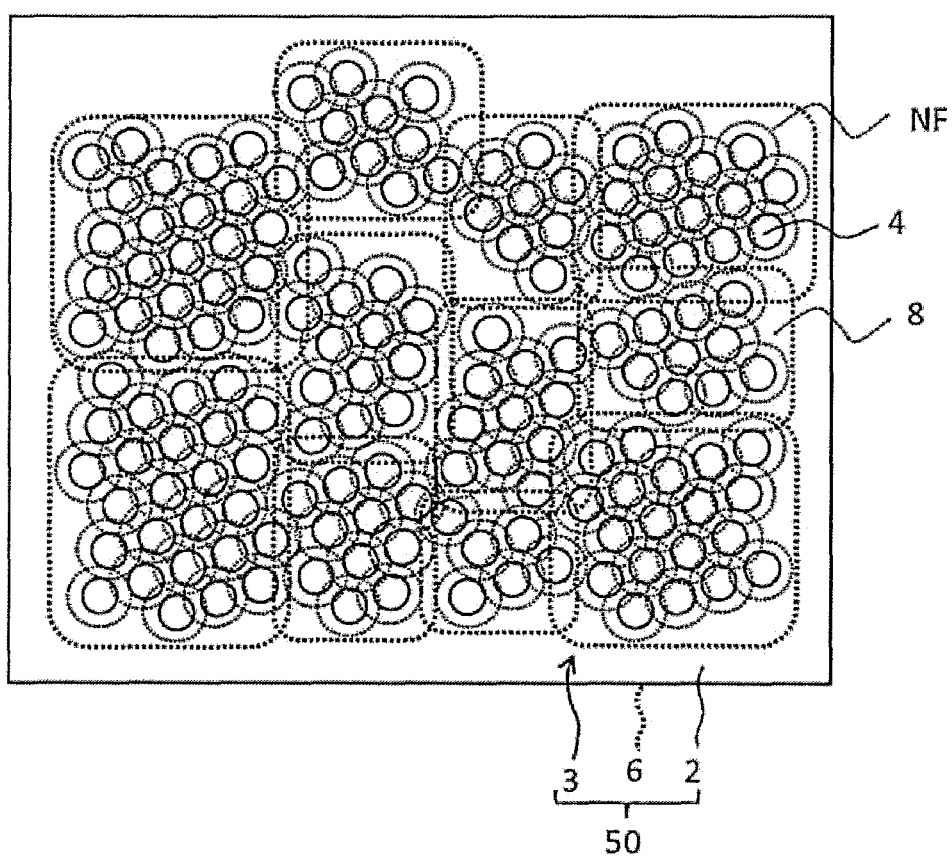
FIG. 5 is an enlarged plane view showing another example of metal nanoparticle arrays. This shows conceptually the near-field light generating region from the metal nanoparticles.

FIG. 5 is an enlarged view showing another example of the metal nanoparticle array 3. As illustrated, the invention includes a case composed of multiple domains 8, in which each domain is a region of the metal nanoparticle array 3 as arrayed with the same regularity. Also in the embodiment of the case, the metal nanoparticles 4 are firmly bonded to the immobilizing layer 2 while the region not covered with the metal nanoparticles 4 can be reduced and the coverage with the nanoparticles can be increased.

Figure 6:
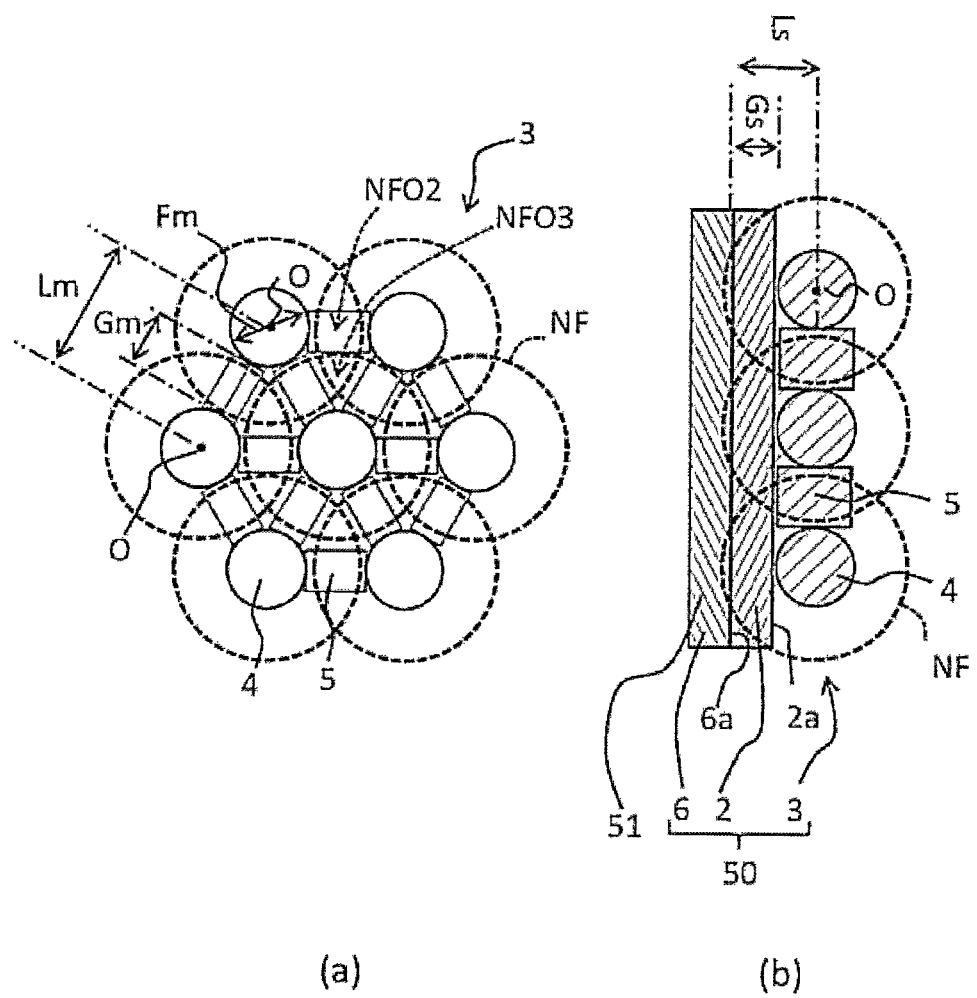
FIG. 6 shows enlarged views of a metal nanoparticle array.

FIG. 6 shows enlarged views of the metal nanoparticle array 3. FIG. 6(a) is an enlarged view of the part E in FIG. 4; and FIG. 6(b) is a cross-sectional view along the line F-F' in FIG. 4.

As shown in FIG. 6, the metal nanoparticles 4 having a particle size of Fm are bonded to each other through intermolecular interaction via the modifying part 5 therebetween. Accordingly, the distance Gm between the metal nanoparticles 4 and the distance Lm between the centers O of the adjacent metal nanoparticles 4 are controlled to be nearly constant, and the metal nanoparticles 4 are bonded firmly to each other. The thickness of the immobilizing layer Gs as well as the distance Ls from the center O of the metal nanoparticle 4 to one surface 6a of the electroconductive layer 6 is also kept nearly constant.

As shown in FIG. 6, the near-field light from the metal nanoparticles 4 is isotropically generated around the metal nanoparticles 4 to form the near-field light NF.

Since the metal nanoparticles 4 are arrayed at regular intervals and adjacently to each other, the region NFO2 where the near-field light is strengthened about two times is formed between the adjacent metal nanoparticles 4.

In the region surrounded by the three adjacent metal nanoparticles 4, the region NFO3 where the near-field light is strengthened about three times is formed.

More concretely, the metal nanoparticles 4 generate localized surface plasmon, and as resonating with the photoelectric field from the external light source, they generate the near-field light in the state of resonation with the localized surface plasmon.

Owing to the electromagnetic interaction between the metal nanoparticles 4 in the metal nanoparticle array 3, the localized surface plasmon resonance frequency shifts in red, and by changing the size of the metal nanoparticles 4 and the gap distance between the metal nanoparticles 4, the localized surface plasmon resonance frequency can be controlled. This means the generation of a strong electric field-enhanced field between the adjacent metal nanoparticles 4.

Figure 7:
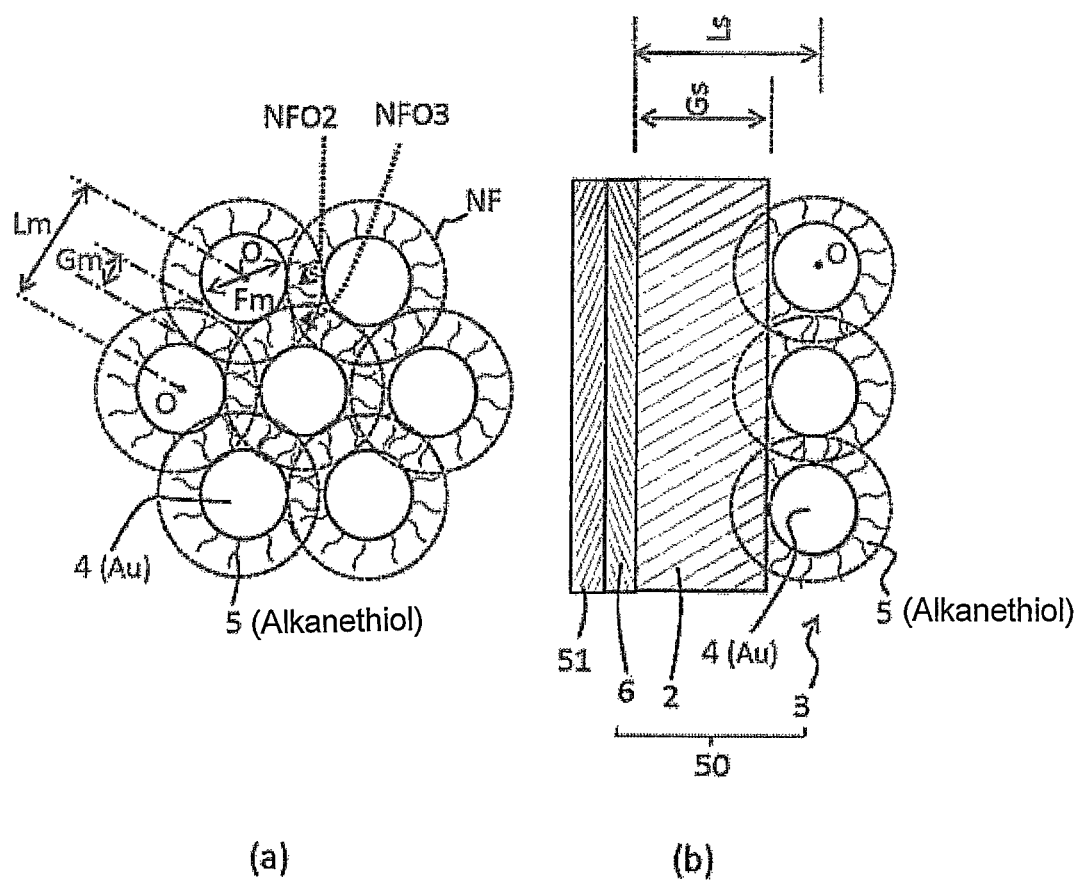
FIG. 7 includes enlarged views more concretely showing the metal nanoparticle array.

FIG. 7 includes enlarged views more concretely showing the metal nanoparticle array 3 shown in FIG. 6.

Au is used as the metal nanoparticle 4, alkanethiol is sued as the modifying part 5, and 1,6-hexanedithiol is used as the immobilizing layer 2. An insulating substrate is arranged on the other surface of the electroconductive layer 6. The insulating substrate may serve as the first member 51, or may be an additional member existing between the first member 51 and the electroconductive layer 6.

In the illustrated configuration, the distance Gm between the metal nanoparticles 4 and the distance Ls from one surface of the electroconductive layer 6 can be controlled by controlling the length of the alkyl chain of the alkanethiol and the 1,6-hexanedithiol.

As shown in FIG. 7, the first member 51 of an insulating substrate may be arranged on the back of the electroconductive layer 6. When a flat substrate is used as the insulating substrate, the metal nanoparticle arrays can be formed as well controlled thereon. Further, using the flat substrate facilitates the handling of the microchannel structure. As the flat substrate, widely selected is a sapphire substrate, a quartz substrate or the like having good surface planarity.

Next described is a production method for the metal nanoparticle arrays 3.

The production method for the metal nanoparticle arrays of the invention comprises a first step of dispersing metal nanoparticles 4 in a solvent to prepare a reaction liquid, filling a liquid tank with the reaction liquid, and arranging two electrodes oppositely to each other inside the liquid tank as completely immersed in the reaction liquid therein, and a second step of applying a voltage to the two electrodes from a power source connected to the two electrodes by wiring so as to move the metal nanoparticles in a mode of field migration, thereby forming organic nanoparticle arrays on one surface of one of the two electrodes.

Figure 8:
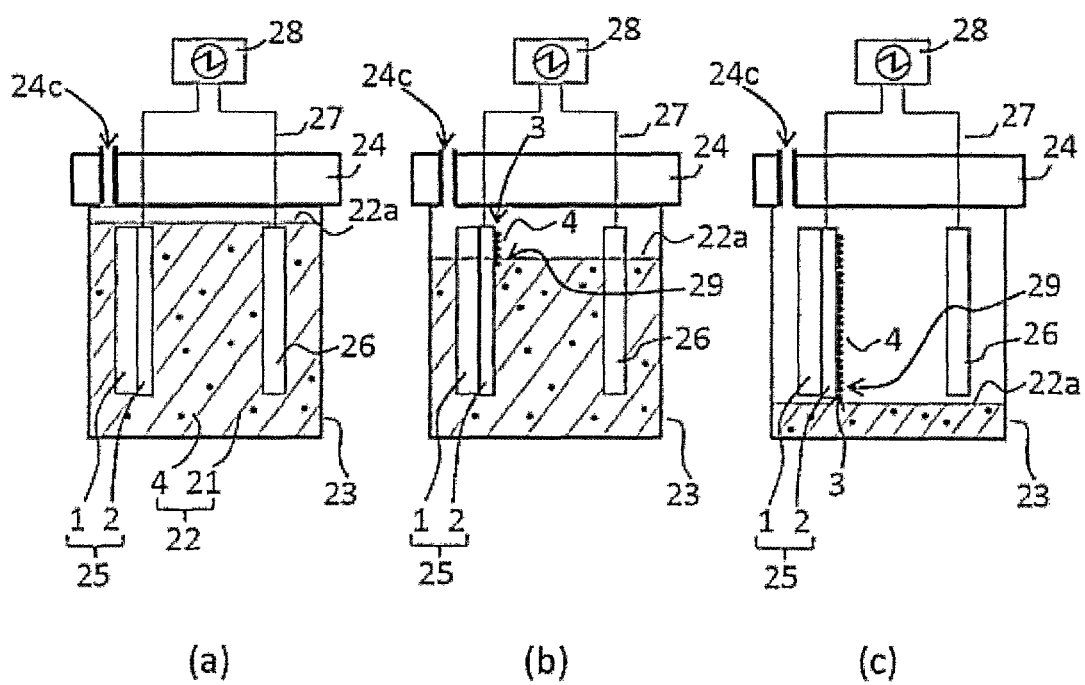
FIG. 8 is a process chart showing the production method for the metal nanoparticle arrays.

FIG. 8 is a process chart showing one example of the production method for the metal nanoparticle arrays 3.

FIG. 8(a) is a cross-sectional view of the process at the end of the first step, in which the metal nanoparticles 4 are dispersed in the solvent 21 to prepare a reaction liquid 22, then the reaction liquid 22 is put into the liquid tank 23, and then two electrodes 25 and 26 are arranged inside the liquid tank 23 to face each other therein, as completely immersed in the reaction liquid 22.

As the solvent 21, used is a volatile solvent. The metal nanoparticle 4 is previously covered with the modifying part 5 of an organic molecule.

As one electrode 25, used is the substrate 1 with the immobilizing layer 2 formed thereon. As substrate 1, used is an electroconductive substrate, and the substrate is so arranged that the immobilizing layer 2 faces the other electrode 26.

The liquid level 22a of the reaction liquid 22 is set at such a position that the two electrodes 25 and 26 could be completely immersed in the reaction liquid 22.

Preferably, the volatile solvent 21 is any of water, alcohols, ketones, esters, halogen solvents, aliphatic hydrocarbons, or aromatic hydrocarbons, or their mixtures. Accordingly, the kinetic and thermodynamic parameters in forming the structure of the metal nanoparticles 4 can be controlled, and the movement of the metal nanoparticles 4 can be promoted or retarded. In addition, the evaporation rate of the volatile solvent 21 could be controlled, and the hydrophilicity or the hydrophobicity for the immobilizing layer 2 could also be controlled.

Preferably, the volatile solvent 21 contains an inorganic salt or an organic salt, or both of the two. Accordingly, the force in electrophoresis of the metal nanoparticles given by the electric field can be controlled.

The second step is a step of evaporating the solvent 21 from the reaction liquid 22 with applying a voltage to the two electrodes 25 and 26 from the power source 28 to thereby make the direct current run through the reaction liquid 22.

When the direct current is made to run through the reaction liquid 22, the charged metal nanoparticles 4 in the reaction liquid 22 begin to move through field migration, and begin to get together around any one of the electrodes.

For example, in case where minus-charged metal nanoparticles 4 are used, they get together around the anode electrode having a plus potential opposite thereto. Accordingly, when one electrode 25 is used as the anode electrode, then the metal nanoparticles 4 get together on the one electrode 25.

In that manner, the matter as to whether the substrate (electroconductive substrate) 1 on which metal nanoparticle arrays are formed is an anode electrode or a cathode electrode is determined depending on the charge potential of the metal nanoparticles 4.

The metal nanoparticles 4 have an ionic energy of electric field×moving distance×charge valence. Accordingly, owing to the ionic energy, the metal nanoparticles 4 are chemically adsorbed by the substrate (electroconductive substrate) 1 having broken through the energy barrier. In the absence of the ionic energy, the substrate could not chemically adsorb the metal nanoparticles having broken through the energy barrier, but could adsorb them merely physically.

FIG. 8(b) is a cross-sectional view of the process at the intermediate point of the second step.

During voltage application, the space above the liquid level 22a on the side of the lid 24 is kept passing to the outside via the hole 24c of the lid 24, and therefore the volatile solvent evaporates away through the hole 24c.

Accordingly, the liquid level 22a of the reaction liquid 22 somewhat descends, whereby the substrate (electroconductive substrate) 1 on the side of the lid 24 is exposed out of the liquid level 22a.

With the descending of the liquid level 22a, the position of the surface part of the immobilizing layer 2 on the substrate (electroconductive substrate) 1 kept in contact with the liquid level 22a of the reaction liquid 22 (air-liquid interface 29) also descends.

Around the air-liquid interface 29, the concentration of the metal nanoparticles 4 is saturated, thereby resulting in nucleation for the two-dimensional arrays of the supersaturated metal nanoparticles 4. In case where the nucleation speed for the two-dimensional arrays of the metal nanoparticles 4 is higher than the evaporation rate of the volatile solvent 21 in the reaction liquid 22, the coverage with the metal nanoparticle arrays 3 could be nearly 100%. Accordingly, the metal nanoparticle arrays 3 can be formed at such a high coverage on the immobilizing layer 2 on the exposed substrate (electroconductive substrate) 1.

The volatilization rate of the volatile solvent can be controlled by controlling the fluid-dynamic resistance to be determined by the opening diameter d and the length of the hole 24c and by the viscosity of the vapor of the volatile solvent (viscosity×length/opening diameter). Accordingly, the descending speed of the liquid level 22a can be thereby controlled.

Chemical adsorption of the metal nanoparticles 4 by the immobilizing layer 2 occurs simultaneously with the nucleation for the two-dimensional arrays of the metal nanoparticles 4.

When the ionic energy is not too large, a sufficient period of time could be provided for securing the energetically-stable physical position necessary for nucleation prior to chemical adsorption, thereby satisfying both chemical adsorption and two-dimensional arraying.

FIG. 8(c) is a cross-sectional view of the process at the end of the second step. The substrate (electroconductive substrate) 1 is completely above the liquid level 22a, and organic nanoparticles arrays 3 are formed on the immobilizing layer 2 on the substrate (electroconductive substrate) 1.

Thus, the organic nanoparticle arrays 3 with the metal nanoparticles 4 firmly bonded to the immobilizing layer 2 at a high coverage are formed.

Further, after the second step, the nanoparticle arrays 3 on the immobilizing layer 2 on the substrate (electroconductive substrate) 1 may be annealed at around 55° C. Accordingly, the chemical bond between the metal nanoparticles 4 and the immobilizing layer 2 can be thereby strengthened more.

Subsequently, the surface of the substrate (electroconductive substrate) 1 is washed with running water or ultrasonically washed in a suitable solvent to thereby remove the metal nanoparticles 4 not chemically bonding to the substrate (electroconductive substrate) 1.

The near-field light microchannel structure 61 of the embodiment of the invention comprises the structure 95 provided with the microchannel 41c and the near-field light two-dimensional array 50 arranged inside the microchannel 41c and enabling in-plane near-field light generating, in which the near-field light two-dimensional array 50 comprises the electroconductive layer 6 formed on the inner wall surface of the microchannel 41c, the immobilizing layer 6 immobilized on one surface 6a of the electroconductive layer 6 via chemical bonding, and metal nanoparticle arrays 3 immobilized on one surface 2a of the immobilizing layer 2 via chemical bonding, and in which the metal nanoparticle arrays 3 each comprise multiple metal nanoparticles 4 arrayed at regular intervals and bonded to each other via the modifying part 5 arranged on the surface thereof. Accordingly, the invention can provide the near-field light microchannel structure that comprises the near-field light two-dimensional array 50 with the metal nanoparticles 4 firmly bonded to the inner wall surface of the microchannel 41c via the electroconductive layer 6 and the immobilizing layer 2.

In the near-field light microchannel structure 61 of the embodiment of the invention, the structure 95 has the first member 51 and the second member 41 laminated on one side 51a of the first member 51, and the microchannel 41c is arranged between the first member 51 and the second member 41. Accordingly, the invention can readily provide the near-field light microchannel structure that comprises the near-field light two-dimensional array 50 with the metal nanoparticles 4 firmly bonded to the inner wall surface of the microchannel 41c via the electroconductive layer 6 and the immobilizing layer 2.

In the near-field light microchannel structure 61 of the embodiment of the invention, the distance between the metal nanoparticles 4 is from 1 to 10 nm. Accordingly, the invention can provide the near-field light microchannel structure that comprises the near-field light two-dimensional array 50 capable of enhancing the photochemical reaction efficiency with the near-field light from the array.

In the near-field light microchannel structure 61 of the embodiment of the invention, the particle size of the metal nanoparticles 4 is from 1 to 100 nm. Accordingly, the invention can provide the near-field light microchannel structure that comprises the near-field light two-dimensional array 50 capable of enhancing the photochemical reaction efficiency with the near-field light from the array.

In the near-field light microchannel structure 61 of the embodiment of the invention, the metal nanoparticles 4 are formed of gold. Accordingly, the invention can provide the near-field light microchannel structure that comprises the near-field light two-dimensional array 50 capable of enhancing the photochemical reaction efficiency with the near-field light from the array.

In the near-field light microchannel structure 61 of the embodiment of the invention, the modifying part 5 is an organic molecule having a thiol group, and the thiol group is bonded to the metal nanoparticles. Accordingly, the invention can provide the near-field light microchannel structure that comprises the near-field light two-dimensional array 50 where the bonding strength between the metal nanoparticles 4 is increased.

In the near-field light microchannel structure 61 of the embodiment of the invention, the organic molecule of the modifying part 5 has an alkyl chain with from 6 to 20 carbon atoms. Accordingly, the invention can provide the near-field light microchannel structure that comprises the near-field light two-dimensional array 50 where the bonding strength between the metal nanoparticles 4 is increased.

In the near-field light microchannel structure 61 of the embodiment of the invention, the immobilizing layer 2 comprises an organic molecule having at least two thiol groups, at least one thiol group is arranged on both one surface 2a and the other surface of the immobilizing layer 2, and the thiol group on the other surface is bonded to the electroconductive layer 6. Accordingly, the invention can provide the near-field light microchannel structure that comprises the near-field light two-dimensional array 50 where the bonding strength between the metal nanoparticle 4 and the electroconductive layer 6 is increased.

In the near-field light microchannel structure 61 of the embodiment of the invention, the organic molecule to constitute the immobilizing layer 2 has an alkyl chain with from 6 to 20 carbon atoms. Accordingly, the invention can provide the near-field light microchannel structure that comprises the near-field light two-dimensional array 50 where the bonding strength between the metal nanoparticle 4 and the electroconductive layer 6 is increased.

In the near-field light microchannel structure 61 of the embodiment of the invention, the first hole 41a to pass to the microchannel 41c is formed in the surface. Accordingly, using the first hole 41a as an inlet hole, a reaction solution can be efficiently injected into the microchannel 41c.

In the near-field light microchannel structure 61 of the embodiment of the invention, the second hole 41b to pass to the microchannel 41c is formed in the surface. Accordingly, using the second hole 41b as a discharge hole, a reaction solution can be efficiently discharged out of the microchannel 41c.

Second Embodiment of the Invention

Next described is a near-field light microchannel structure of the second embodiment of the invention.

Figure 9:
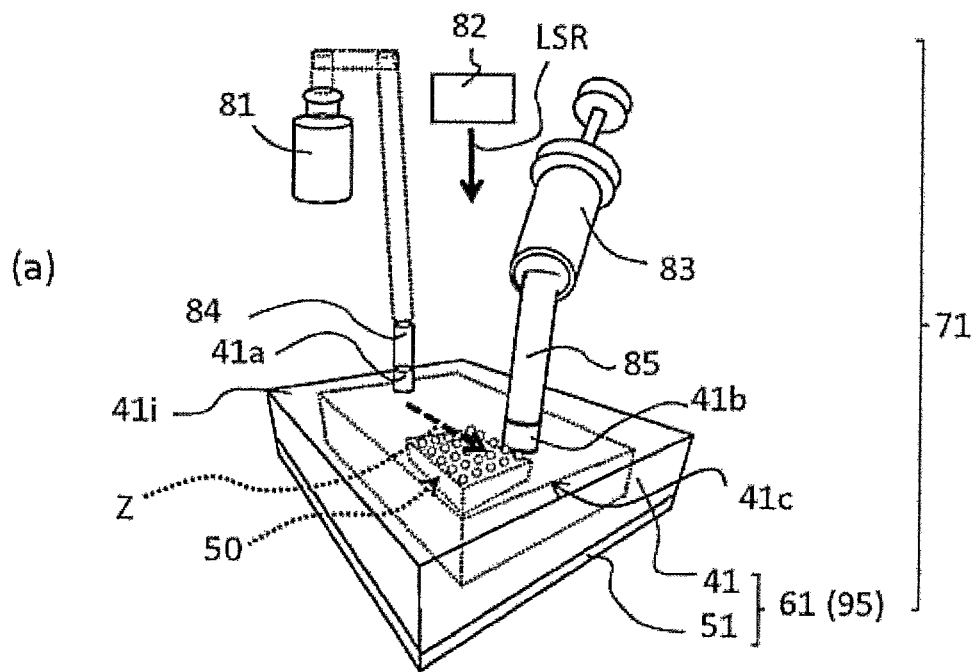
FIG. 9 shows one example of the near-field light microreactor of an embodiment of the invention.
Figure 9:
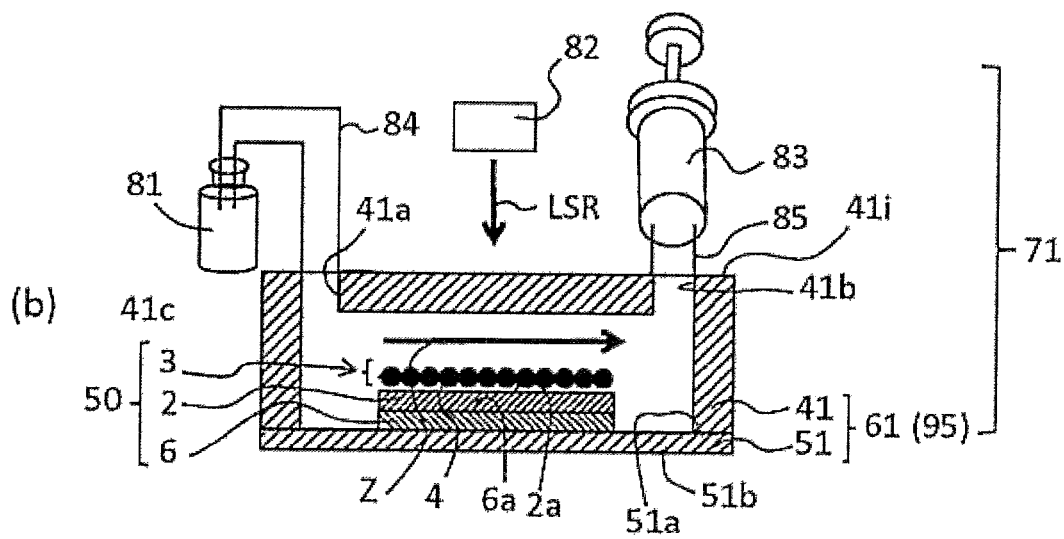

FIG. 9 is a view showing one example of the near-field light microreactor 71 of the second embodiment of the invention. FIG. 9(a) is a perspective view; and FIG. 9(b) is a vertical cross-sectional view.

As shown in FIG. 9(a) and FIG. 9(b), the near-field light microreactor 71 of the second embodiment of the invention comprises, as the outline thereof, the near-field light microchannel structure 61 of the first embodiment of the invention, the reaction solution supply 81, the pump 83 and the light source 82.

In one surface 41i of the second member 41, formed are the first hole 41a and the second hole 41b both passing to the microchannel 41c.

The first hole 41a is connected to the reaction solution supply 81 via the connecting tube 84. As the reaction solution supply 81, sued is a chemical bottle or the like filled with a reaction solution.

The second hole 41b is connected to the pump 83 via the connecting tube 85. As the pump 83, used is a syringe pump or the like.

The system is so configured that the reaction solution can be made to run in the direction of the arrow Z (flow path direction) by operating the pump 83.

On the side of one surface 41i of the second member 41, arranged is the light source 82. The system is so configured that the light from the light source 82 is radiated in the direction of the arrow LSR (irradiation direction) and the near-field light two-dimensional array 50 can be thereby irradiated with a predetermined light. The predetermined light is one having a wavelength distribution corresponding to the local plasmon absorption band of the near-field light two-dimensional array 50.

The irradiation direction LSR is nearly vertical to one surface 2a of the immobilizing layer 2. Accordingly, the metal nanoparticle arrays 3 can be uniformly irradiated with light. However, the irradiation direction LSR is not limited to the case. For example, the irradiation direction may be any oblique direction so far as the metal nanoparticle arrays 3 can be photoirradiated. In case where the electroconductive layer 6 of the near-field light two-dimensional array 50 is formed of a transparent electroconductive material such as an ITO substrate or the like, the photoirradiation may be attained toward the back of the substrate.

The near-field light microreactor 71 of the embodiment of the invention comprises the near-field light microchannel structure 61, the reaction solution supply 81 for feeding a reaction liquid to the microchannel 41c, the pump 83 for sucking a reaction liquid in the microchannel 41c, and the light source 82 for photoirradiating the near-field light two-dimensional array 50 in the microchannel 41c. Accordingly, the invention can provide the near-field light microreactor 71 having the near-field light microchannel structure that comprises the near-field light two-dimensional array 50 with the metal nanoparticles 4 firmly bonded to the inner wall surface of the microchannel 41c via the electroconductive layer 6 and the immobilizing layer 2.

In the near-field light microreactor 71 of the embodiment of the invention, the reaction solution supply 81 is connected to the first hole 41a. In this, therefore, a reaction solution can be efficiently fed into the microchannel 41c.

In the near-field light microreactor 71 of the embodiment of the invention, the pump 83 is connected to the second hole 41b. In this, therefore, a reaction solution can be efficiently sucked out of the microchannel 41c.

Third Embodiment of the Invention

Next described is a near-field light microchannel of the third embodiment of the invention.

Figure 10:
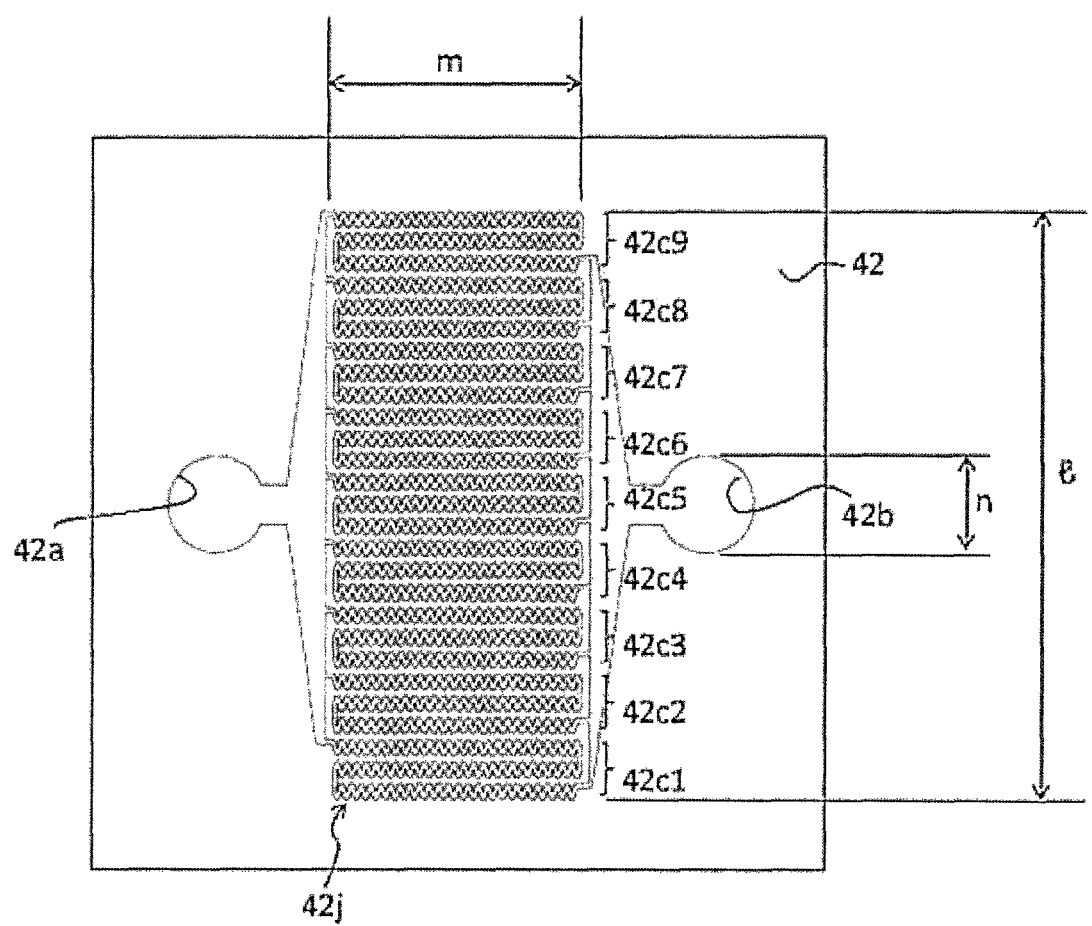
FIG. 10 is a view for explaining another example of the near-field light microchannel structure of an embodiment of the invention, and this is a plan view showing another example of the second member.

FIG. 10 is a view for explaining the near-field light microchannel structure of the third embodiment of the invention, and this is a plan view showing another example of the second member.

The near-field light microchannel structure of the third embodiment of the invention has the same configuration as that of the near-field light microchannel structure of the first embodiment of the invention except that the second member shown in FIG. 10 is used.

As shown in FIG. 10, the second member 42 of the near-field light microchannel structure of the third embodiment of the invention has 9 microchannels 42c1 to 42c9, between the first hole 42a having an opening diameter n and the second hole 42b having an opening diameter n.

The microchannels 42c1 to 42c9 each have a bended part 42j. Accordingly, the microchannel length in a predetermined area of a length l×width m can be prolonged and the photoreaction efficiency in the microchannels can be thereby enhanced.

The multichannel configuration also enhances the photochemical reaction efficiency therein.

In the near-field light microchannel structure 61 of the embodiment of the invention, the microchannel 41c is so configured as to have the bended part 42j, and therefore the microchannel length in a predetermined area can be prolonged and the photoreaction efficiency therein can be enhanced.

The near-field light microchannel structure 61 of the embodiment of the invention is so configured as to have multiple microchannels 42c1 to 42c9, and therefore, the microchannel length in a predetermined area can be prolonged and the photoreaction efficiency therein can be enhanced.

Fourth Embodiment of the Invention

Next described is a near-field light microreactor of the fourth embodiment of the invention.

Figure 11:
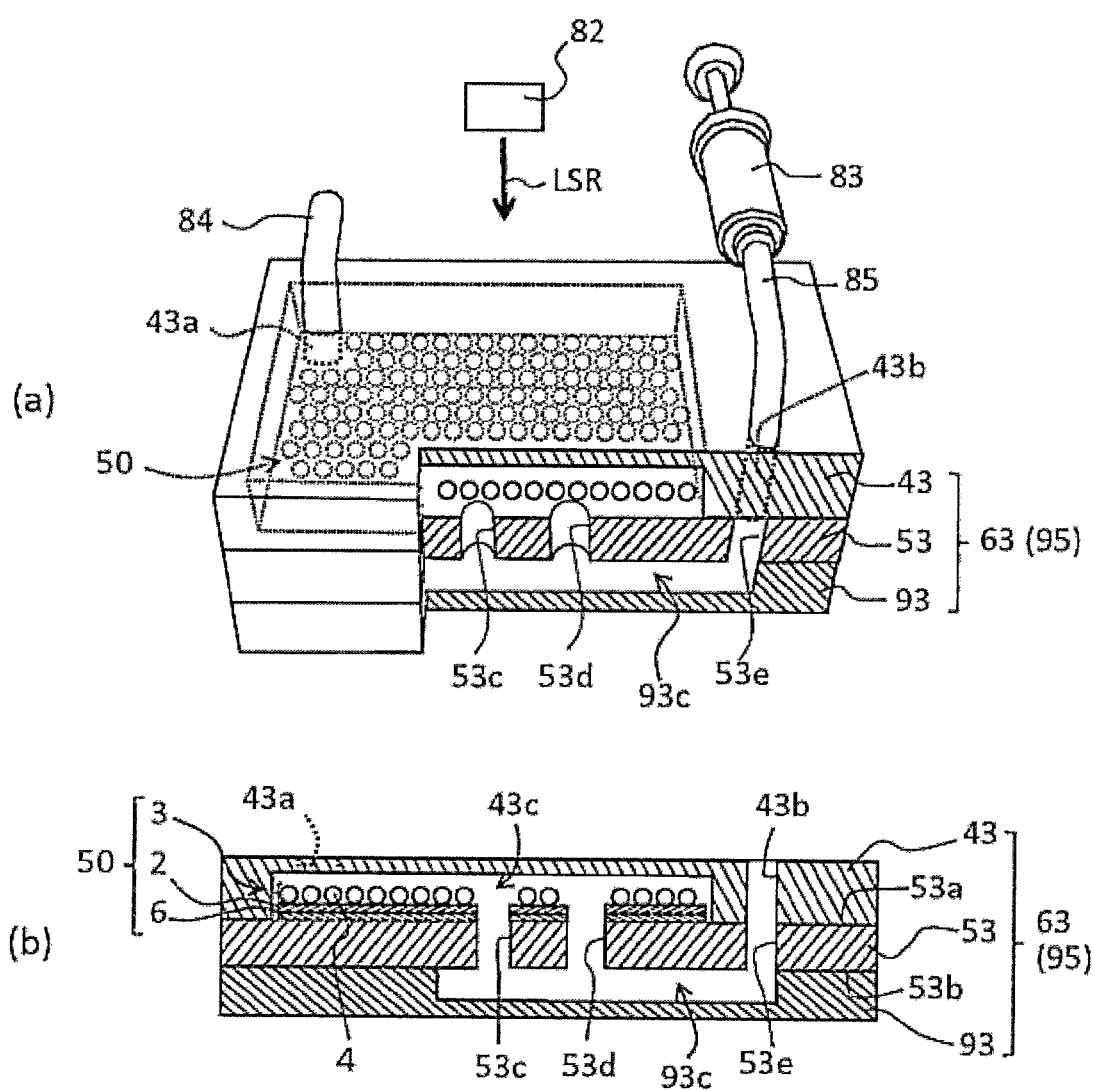
FIG. 11 includes views for explaining another example of the near-field light microreactor of an embodiment of the invention.

FIG. 11 includes views for explaining the near-field light microreactor of the fourth embodiment of the invention. FIG. 11(a) is a partly-cut perspective view; and FIG. 11(b) is a vertical cross-sectional view of the near-field light microchannel structure to be used in the near-field light microreactor.

As shown in FIG. 11, the configuration of the near-field light microchannel 63 in the fourth embodiment of the invention is the same as that of the near-field light microchannel in the first embodiment of the invention, except that the third holes 53c and 53d each passing to the microchannel 43c are formed in the first member 53, that the third holes 53c and 53d each pass to another microchannel 93c formed between the first member 53 and the third member 93 laminated on the other surface 53b of the first member 53 and that the holes 53e and 43b each passing to the other microchannel 93c are formed in the first member 53 and the second member 43.

Forming the two third holes 53c and 53d in the first member 53 makes the flow of the reaction solution run faster through the microchannel 43c and changes the flow direction to increase the contact area with the near-field light two-dimensional array 50 to thereby enhance the photoreaction efficiency in the reactor.

In the near-field light microchannel structure 63 of the embodiment of the invention, the third holes 53c and 53d formed are in the first member 53 to pass to the microchannel 43c. In this, therefore, the flow speed of the reaction solution to run through the microchannel 43c can be increased, and the flow direction can be changed to increase the contact area with the near-field light two-dimensional array 50 to thereby enhance the photoreaction efficiency in the reactor.

In the near-field light microchannel structure 63 of the embodiment of the invention, the fourth hole 43b is formed in the surface thereof to pass to the other microchannel 93c. In this, therefore, the flow speed of the reaction solution to run through the microchannel 43c can be increased, and the flow direction can be changed to increase the contact area with the near-field light two-dimensional array 50 to thereby enhance the photoreaction efficiency in the reactor.

In the near-field light microchannel structure 63 of the embodiment of the invention, the third holes 53c and 53d each pass to the other microchannel 93c formed between the first member 53 and the third member 93 laminated on the other surface 53b of the first member 53. In this, therefore, the reaction solution running through the microchannel 43c can run also through the other microchannel 93 and the flow speed of the reaction solution can be thereby increased to enhance the photoreaction efficiency in the reactor.

Fifth Embodiment of the Invention

Next described is a near-field light microchannel structure of the fifth embodiment of the invention.

Figure 12:
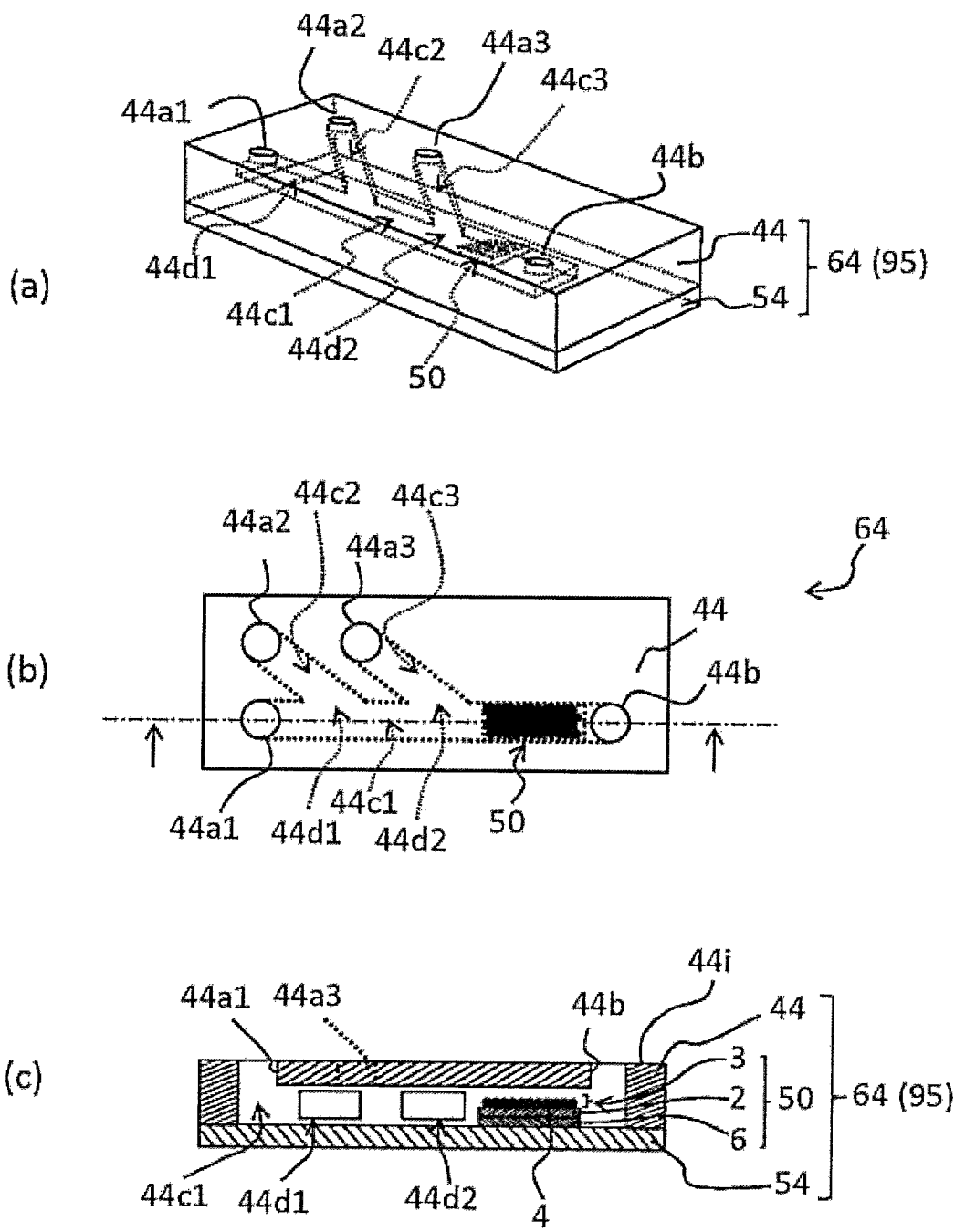
FIG. 12 includes views showing another example of the near-field light microchannel structure of an embodiment of the invention.

FIG. 12 includes views showing another example of the near-field light microchannel structure of the embodiment of the invention. FIG. 12(a) is a perspective view; FIG. 12(b) is a plan view; and FIG. 12(c) is a vertical cross-sectional view.

As shown in FIG. 12, the configuration of the near-field light microchannel structure 64 of the fifth embodiment of the invention is the same as that of the near-field light microchannel structure of the first embodiment of the invention, except that the first holes 44a1, 44a2 and 44a3 and the second holes 44b are formed in one surface 44i of the second member 44, that the first hole 44a1 and the second hole 44b are made to pass to each other via the first microchannel 44c1 linearly connecting the two, and that the branched microchannels 44c2 and 44c3 are branched from the first microchannel 44c1.

As shown in FIG. 12, the branched microchannels 44c2 and 44c3 are made to pass to the first microchannel 44c1 via the first joint part 44d1 and the second joint part 44d2, respectively.

The near-field light two-dimensional array 50 is arranged between the second hole 44b and the second joint part 44d2.

In the microreactor having the configuration as above, the first holes 44a1, 44a2 and 44a3 each may serve as a solution injection part and the second hole 44b as a solution discharge part, and the microreactor of the type can be applied to a combined reaction mode of chemical reaction with no photoirradiation and photochemical reaction For example, two different types of chemical reaction starting substances, each as dissolved in a suitable solvent, are injected through the first holes 44a1 and 44a2 and subjected to chemical reaction (with no photoirradiation) in the first joint part 44d1 to form a first reaction solution.

Next, a second reaction solution of another type of a chemical reaction starting substance dissolved in a suitable solvent is injected through the first hole 44a3. Accordingly, the first reaction solution and the second reaction solution may be made to run above the near-field light two-dimensional array 50.

Next, the near-field light two-dimensional array 50 is photoirradiated to generate a near-field light. With that, the first reaction solution and the second reaction solution are subjected to photochemical reaction.

In the near-field light microchannel structure 64 of the embodiment of the invention, the first holes 44a1, 44a2 and 44a3 are formed in the surface of the near-field light microchannel structure 54, and the microchannel 44c comprises the first microchannel 44c1 that linearly connects the first hole 44a1 and the second hole 44b, and the branched microchannels 44c2 and 44c3 branched from the first microchannel 44c1. In this, therefore, two stages of different chemical reactions can be attained.

In the near-field light microchannel structure 64 of the embodiment of the invention, the branched microchannels 44c2 and 44c3 are formed, and in the first microchannel 44c1, the near-field light two-dimensional array 50 is arranged on the side of the second hole 44b opposite to the joint parts 44d1 and 44d2. In this, therefore, two reaction solutions may be first mixed and then subjected to chemical reaction with no photoirradiation, and thereafter may be subjected to photochemical reaction, as assisted by near-field light therein, with another reaction solution.

Sixth Embodiment of the Invention

Next described is a near-field light microchannel structure of the sixth embodiment of the invention.

Figure 13:
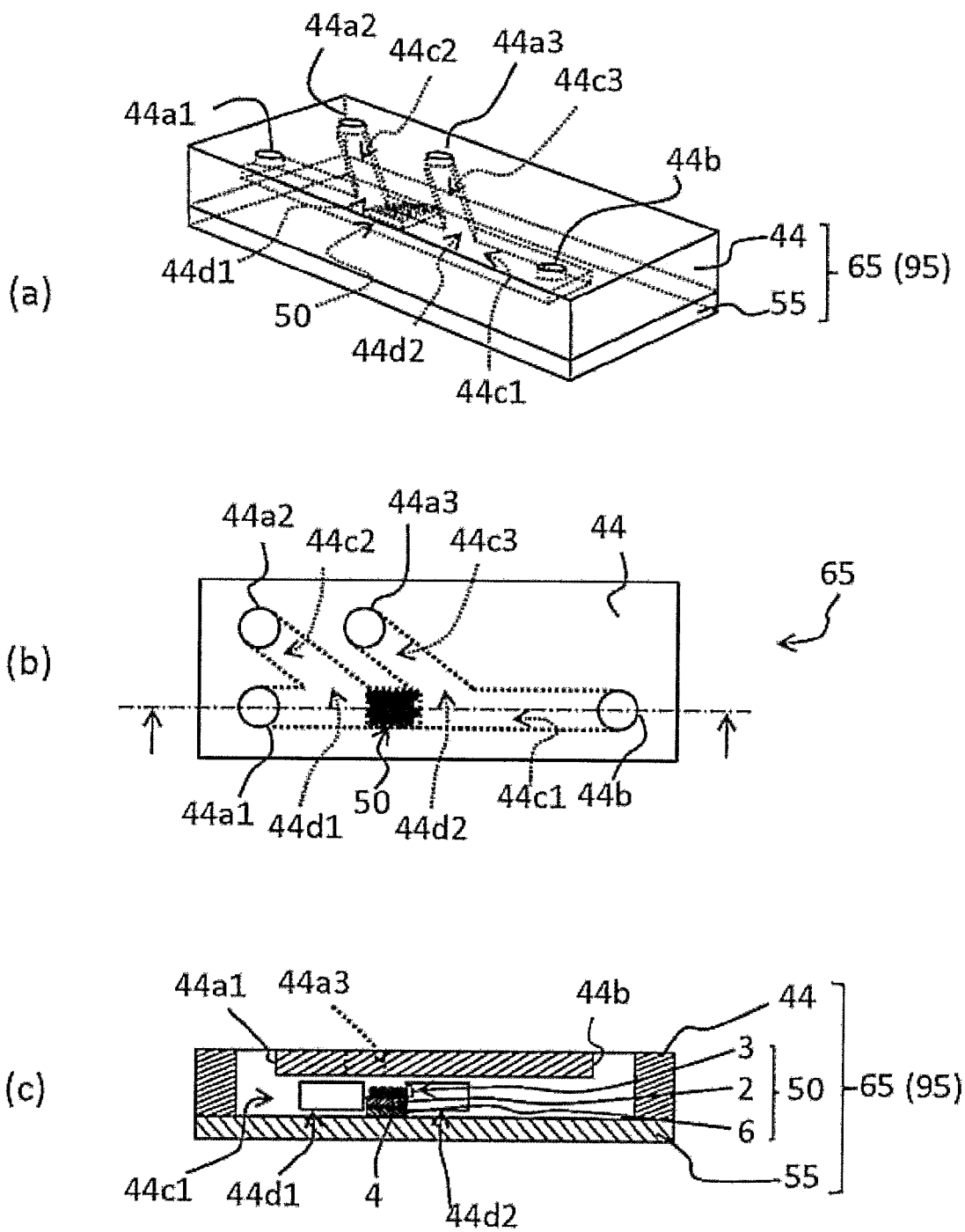
FIG. 13 includes views showing still another example of the near-field light microchannel structure of an embodiment of the invention.

FIG. 13 includes views showing still another example of the near-field light microchannel structure of the embodiment of the invention. FIG. 13(a) is a perspective view; FIG. 13(b) is a plan view; and FIG. 13(c) is a vertical cross-sectional view.

As shown in FIG. 13, the configuration of the near-field light microchannel structure 65 of the sixth embodiment of the invention is the same as that of the near-field light microchannel structure of the fifth embodiment of the invention, except that the near-field light two-dimensional array 50 is arranged between the first joint part 44d1 and the second joint part 44d2.

Having the configuration as above, the microreactor of the embodiment is applicable to a chemical reaction opposite to the chemical reaction applicable to the fifth embodiment of the invention, or that is, in the microreactor of this embodiment, photochemical reaction may be first attained and may be followed by chemical reaction with no photoirradiation.

For example, two different types of chemical reaction starting substances, each as dissolved in a suitable solvent, are injected through the first holes 44a1 and 44a2 and mixed in the first joint part 44d1 to prepare a third reaction solution.

Next, the near-field light two-dimensional array 50 is photoirradiated to generate a near-field light. With that, the third reaction solution is subjected to photochemical reaction.

Next, a second reaction solution of another type of a chemical reaction starting substance dissolved in a suitable solvent is injected through the first hole 44a3. With that, the third reaction solution and the second reaction solution are mixed and subjected to chemical reaction with no photoirradiation.

In the near-field light microchannel structure 65 of the embodiment of the invention, the branched microchannels 44a2 and 44a3 are formed, and in the first microchannel 44c1, the near-field light two-dimensional array 50 is arranged between the joint parts 44d1 and 44d2 of the adjacent branched microchannels 44a2 and 44a3. In this, therefore, a reaction solution prepared by mixing two reaction solutions may be first subjected to photochemical reaction as assisted by the near-field light generated therein, and then may be subjected to chemical reaction with another reaction solution with no photoirradiation.

The near-field light microchannel structure and the near-field light microreactor of the invention are not limited to the above-mentioned embodiments; and within the scope of the technical idea thereof, the invention can be changed and modified variously. Specific examples of the embodiments of the invention are described below with reference to the following Examples. However, the invention should not be limited to these Examples.

EXAMPLES

Example 1

Preparation of Reaction Liquid

First, gold nanoparticles having a particle size of about 9 nm were modified with hexanethiol.

Next, the hexanethiol-modified gold nanoparticles were dispersed in a volatile solvent of n-hexane at a concentration of $5.7 \times 10^{13}$/ml to prepare a reaction liquid.

Production of Substrate

One surface of a glass substrate (having a size of 15 mm×15 mm) coated with a gold thin film was modified with 1,6-hexanedithiol to form a immobilizing layer thereon.

Step of Producing Gold Nanoparticle Two-Dimensional Array

First, the liquid tank of a particle immobilizing apparatus was filled with the above-mentioned reaction liquid.

Next, an anode electrode of a carbon electrode and a cathode electrode of the glass substrate with the immobilizing layer and the gold thin film (electroconductive layer) formed thereon were immersed in the reaction liquid.

The anode electrode and the cathode electrode were so arranged that the electrode sides of the two could face each other, and the distance between the electrode sides was 1.2 mm.

Next, the upper opening of the liquid tank was closed with a lid.

Next, by controlling the opening diameter of the hole of the lid, the descending speed of the liquid level of the reaction liquid was made to be 4 mm/hr at room temperature and under normal pressure (1 atmospheric pressure, 25° C.)

Simultaneously, the power source was controlled to impart a voltage of 1 V between the anode electrode and the cathode electrode.

At the stage where the reaction liquid was vaporized until the electrodes could be completely exposed out of the reaction liquid, the cathode electrode was taken out. Formation of metal nanoparticle arrays on the immobilizing layer of the cathode electrode was visually confirmed.

Next, the gold thin film surface was annealed at 40 to 60° C.

Next, the gold thin film surface was washed with running water, and further ultrasonically washed in a hexane solvent (24.8 kHz, 1 minute).

Accordingly, there was produced a metal nanoparticle array structure (10 Hex) with metal nanoparticle arrays formed on the substrate via the immobilizing layer and the gold thin film

Example 2

A metal nanoparticle array structure (10 Dod) was produced in the same manner as in Example 1 except that dodecanethiol (DOD) was used in place of the hexanethiol molecule.

Example 3

A metal nanoparticle array structure (10 Hexd) was produced in the same manner as in Example 1 except that hexadecanethiol (HEXD) was used in place of the hexanethiol molecule.

Example 4

A metal nanoparticle array structure (30 Dod) was produced in the same manner as in Example 2 except that metal nanoparticles having a particle size Fm of from 29 to 30 nm were used.

Comparative Example 1

An electroconductive thin film of gold (hereinafter referred to as a gold thin film) was formed on a glass substrate (having a size of 15 mm×15 mm), and then the surface of the gold thin film was modified with 1,6-hexanedithiol to form a immobilizing layer thereon.

Next, using HEX-modified gold nanoparticles, a metal nanoparticle array structure was formed on the immobilizing layer of the glass substrate with the immobilizing layer and the gold thin film formed thereon according to a known Langmuir method.

SEM Observation

The metal nanoparticle array structures of Examples 1 to 3 were observed through SEM.

Figure 14:
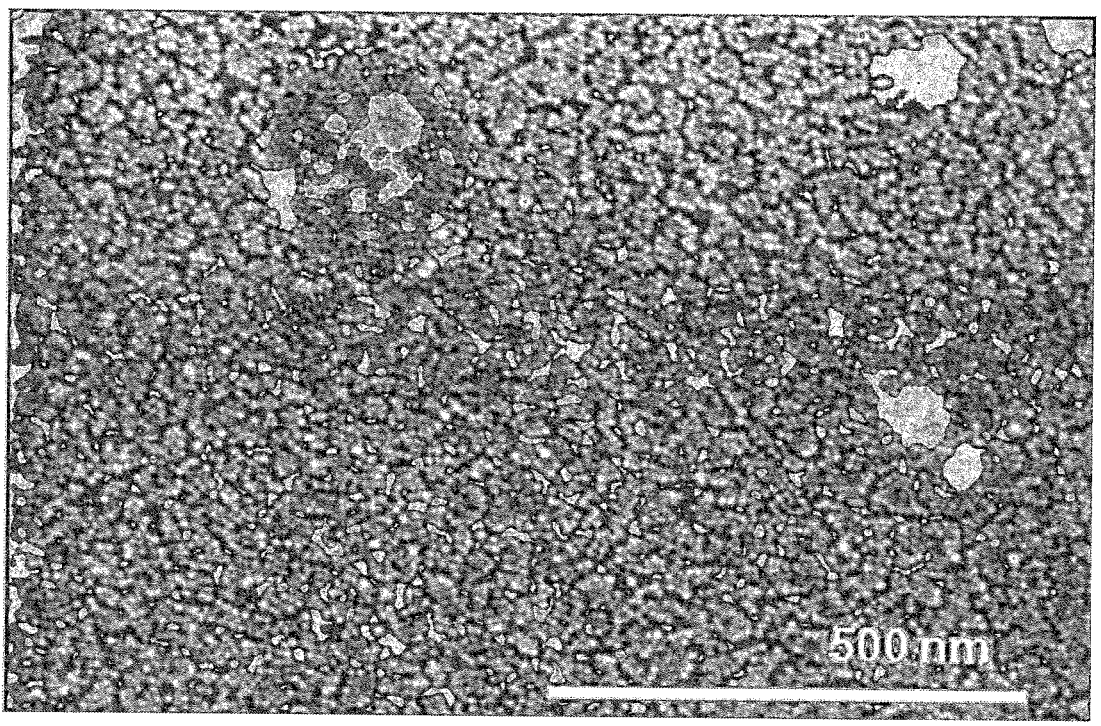
FIG. 14 is a SEM image of the metal nanoparticle array of Example 1.

FIG. 14 is a SEM image of the metal nanoparticle array structure of Example 1. The particle size Fm of the gold nanoparticles is 9 nm, the particle-to-particle distance Lm is 10.6 nm, and the gap distance Gm between the nanoparticles is 1.6 nm.

Figure 15:
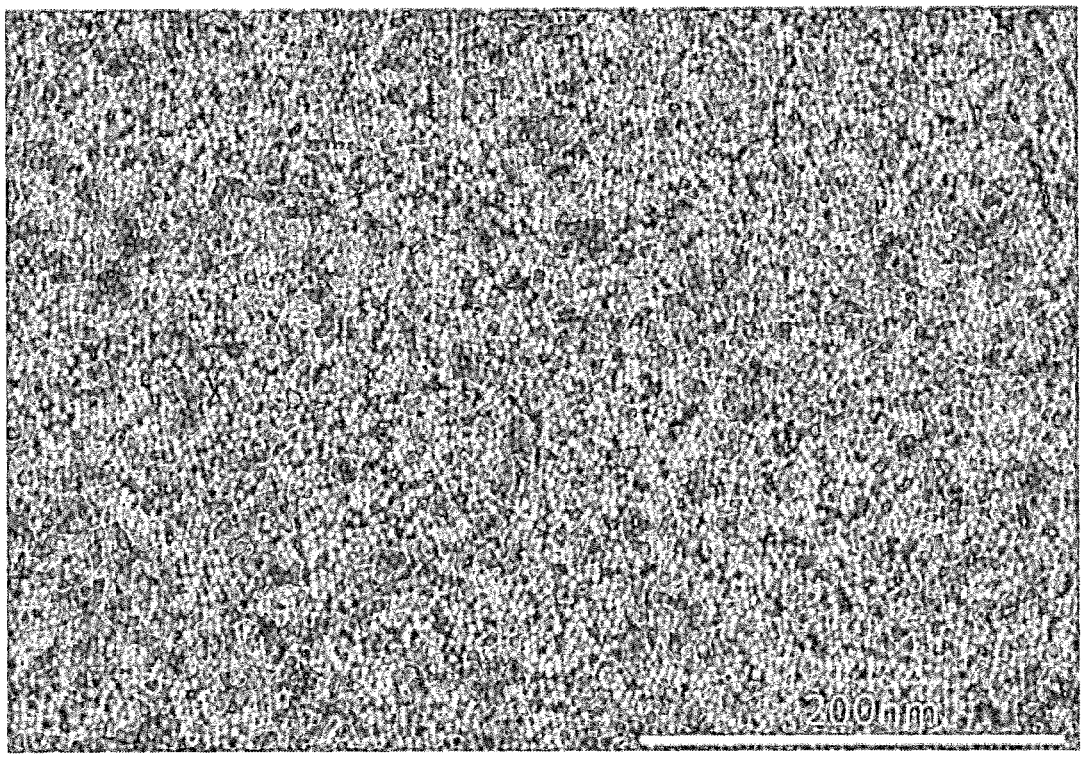
FIG. 15 is a SEM image of the metal nanoparticle array of Example 2.

FIG. 15 is a SEM image of the metal nanoparticle array structure of Example 2. The particle size Fm of the gold nanoparticles is 9 nm, the particle-to-particle distance Lm is 11.4 nm, and the gap distance Gm between the nanoparticles is 2.4 nm.

The coverage with the metal nanoparticle arrays using the gold nanoparticles is 90% or more. Almost the entire range of the substrate having a size of 15 mm×15 mm attained the coverage.

Figure 16:
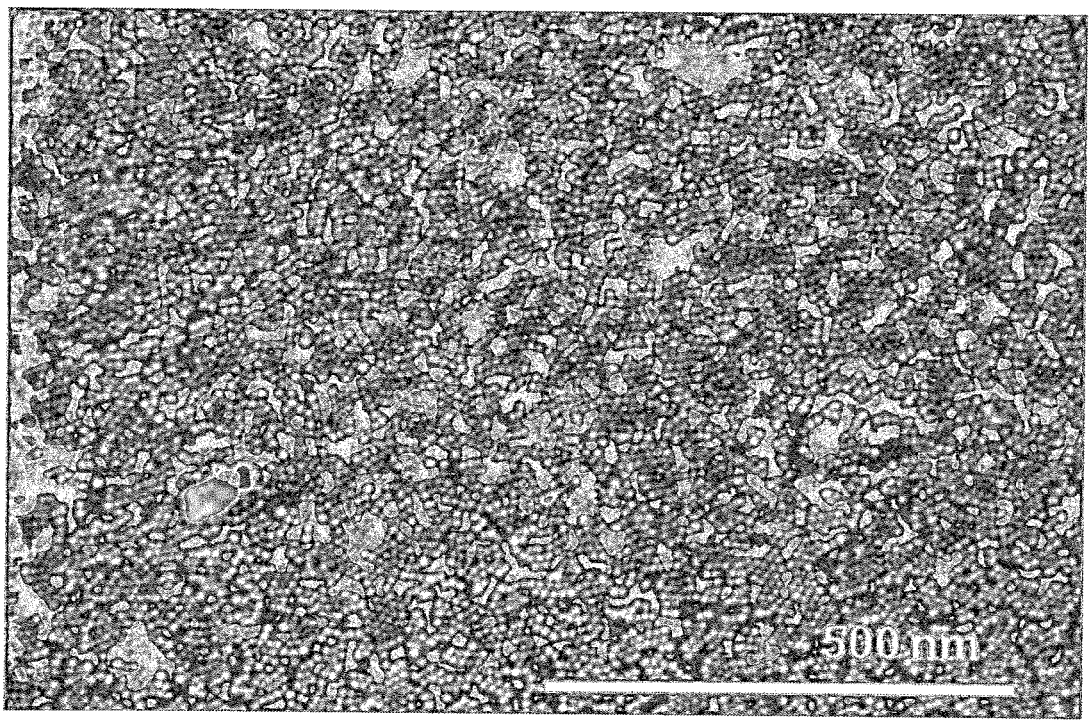
FIG. 16 is a SEM image of the metal nanoparticle array of Example 3.

FIG. 16 is a SEM image of the metal nanoparticle array structure of Example 3. The particle size Fm of the gold nanoparticles is 9 nm, the particle-to-particle distance Lm is 11.9 nm, and the gap distance Gm between the nanoparticles is 2.9 nm. All the arrays have a hexagonal closed packing structure as the nearest neighbor structure.

Small-Angle Scattering Spectrometry

Next, the samples were analyzed through small-angle scattering spectrometry. The particle-to-particle distance can be determined more accurately in small-angle scattering spectrometry than in SEM.

Figure 17:
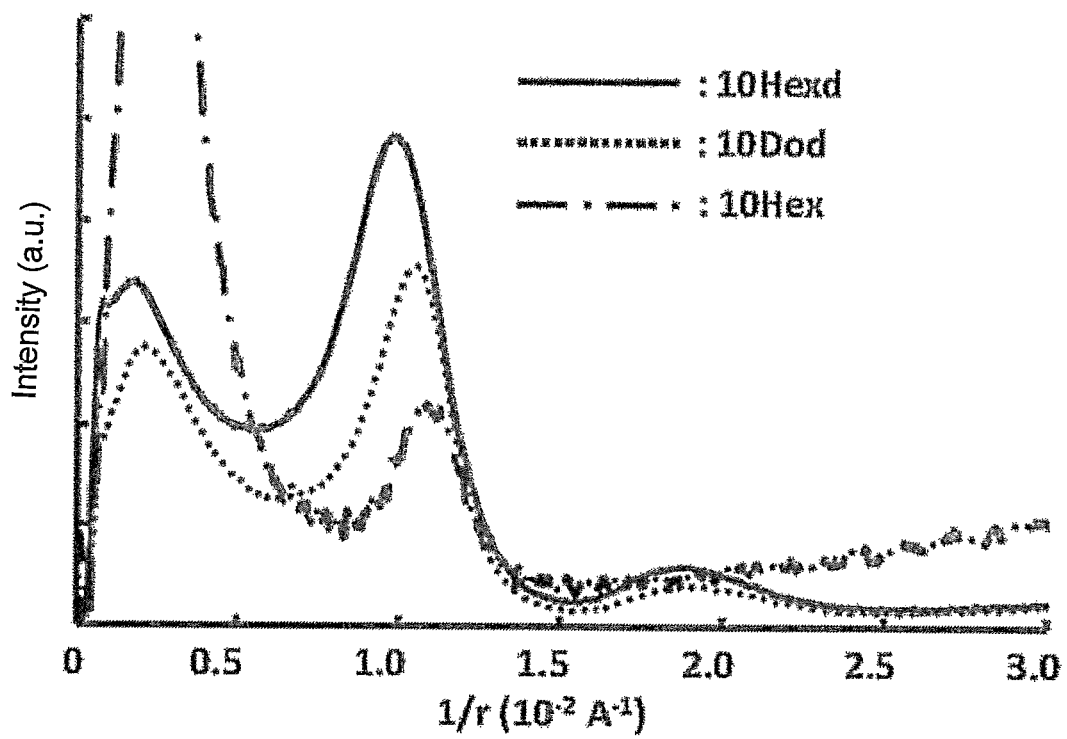
FIG. 17 shows small-angle scattering spectra of the metal nanoparticle arrays of Examples 1 to 3.

FIG. 17 shows the data of small-angle scattering spectra of the metal nanoparticle array structures of Examples 1 to 3. From the results in FIG. 17, the particle-to-particle distance in the case where the hexanethiol molecule, the dodecanethiol molecule or the hexadecanethiol molecule was used is 10.8 nm, 11.0 nm and 11.8 nm, respectively. The results indicate that when the length of the alkane molecule is larger, then the particle-to-particle distance becomes longer.

This means that the particle-to-particle distance $G_m$ between the gold nanoparticles can be controlled by selecting the modifying molecule, and in particular, it is verified that the carbon number of the alkanethiol molecule and the particle-to-particle distance $G_m$ are proportional to each other.

Extinction Spectrometry

Next, the metal nanoparticle array structures of Examples 1 to 3 were analyzed through extinction spectrometry.

Figure 18:
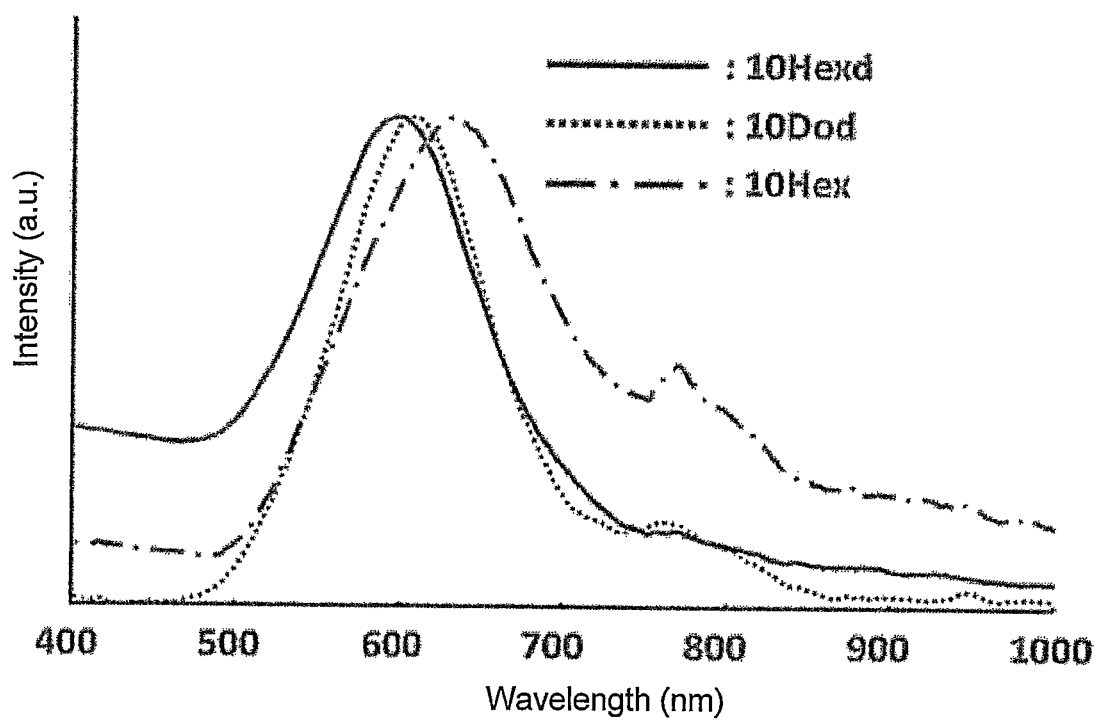
FIG. 18 shows extinction spectra of the metal nanoparticle arrays of Examples 1 to 3.
Figure 19:
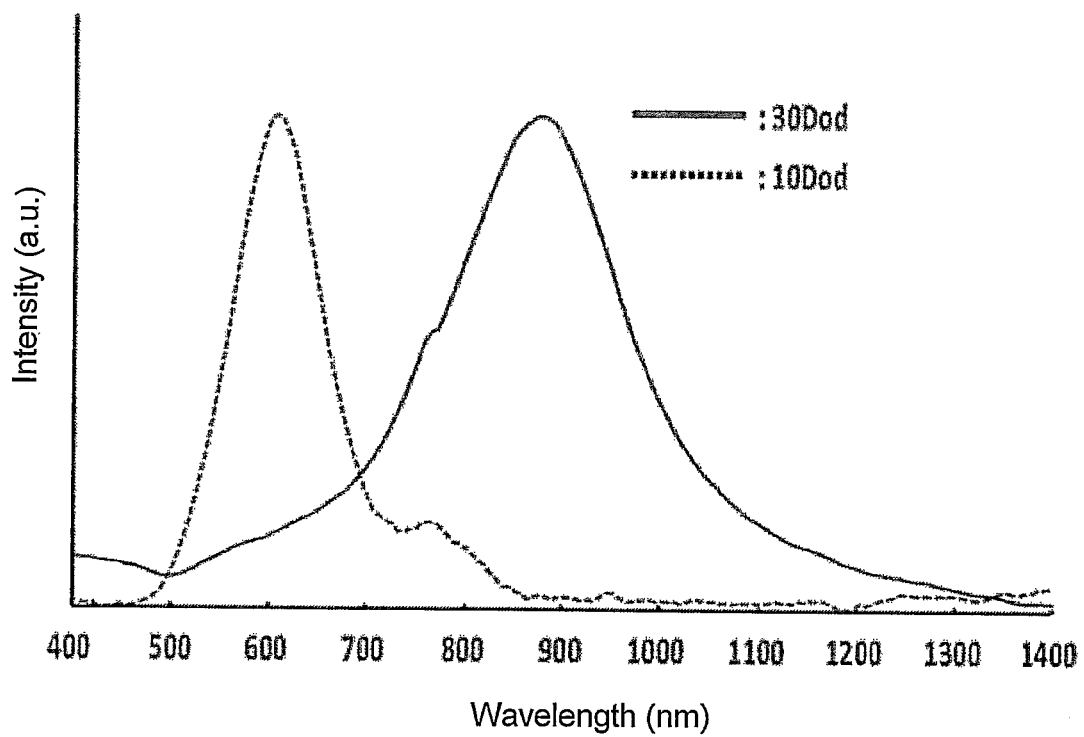
FIG. 19 shows extinction spectra of the metal nanoparticle arrays of Example 2 and Example 4.

FIG. 18 shows the extinction spectra of the metal nanoparticle arrays of Examples 1 to 3; and FIG. 19 shows the extinction spectra of the metal nanoparticle arrays of Example 2 and Example 4.

In these, the extinction spectral peak shows the frequency of the local plasmon resonance of the gold nanoparticles that constitute the gold nanoparticle arrays.

As shown in FIG. 18, in case where the particle size $F_m$ of the gold nanoparticles was immobilized to be 10 nm and when the modifying molecule was changed to the hexanethiol molecule, the dodecanethiol molecule or the hexadecanethiol molecule, then the extinction spectral peak (frequency of local plasmon resonance) changed from 630 nm to 599 nm. This indicates that by changing the size of the modifying molecule, the frequency of local plasmon resonance can be controlled.

As shown in FIG. 19, in case where the modifying molecule was immobilized to be the dodecanethiol molecule and when the particle size $F_m$ of the gold nanoparticles was changed from 10 nm to 30 nm, then the extinction spectral peak (frequency of local plasmon resonance) changed from 599 nm to 880 nm.

From the above results, it is known that the local plasmon resonance frequency is defined depending on the particle-to-particle gap distance $G_m$ between the gold nanoparticles and the particle size $F_m$ of the gold nanoparticles.

The dependency is suggested also in Non-Patent Reference 21, and was verified in a simplified manner in these Examples.

Measurement of Mechanical Strength (Chemical Bond Strength)

The mechanical strength between the gold nanoparticles and the electroconductive substrate (the gold thin film on the glass substrate) through chemical bonding to the electroconductive substrate was confirmed by ultrasonic washing in a hexane solvent (24.8 kHz, 5 minutes).

The metal nanoparticle array structure of Comparative Example 1 remained only 18%. On the other hand, the metal nanoparticle array structure of Example 1 remained 71%.

The measured results of the mechanical strength confirmed the chemical bonding of the metal nanoparticle arrays to the electroconductive substrate via the immobilizing layer, verifying the effect of the durability of maintaining the mechanical strength even after ultrasonic washing in the hexane solvent.

The mechanical strength is a technical point important for the metal nanoparticle arrays to be arranged in a microreactor flow path.

Production of Near-Field Light Microchannel Structure

Example 5

Next, using the metal nanoparticle array structure of Example 2, a near-field light microchannel structure of Example 5 was produced First, a transparent substrate of PDMS (polydimethylsiloxane) was prepared.

Next, according to an in-print method, a microchannel groove pattern having a size of 1 mm width×50 μm height×5 mm length was formed on one surface of the transparent substrate, and two holes were formed to connect the other surface of the transparent substrate with the microchannel.

Next, the glass substrate of the metal nanoparticle structure of Example 1 was bonded to the transparent substrate in such a matter that the metal nanoparticle array could be arranged inside the microchannel groove, and the two were mechanically immobilized to produce a near-field light microchannel structure of Example 5.

Production of Near-Field Light Microreactor

Example 6

Next, using the near-field light microchannel structure of Example 5, a near-field light microreactor was produced.

First, a silicone pipe was connected to each of the two holes formed in the transparent substrate, using an adhesive.

Next, a chemical bottle was connected to one silicone pipe and a syringe pump was to the other silicone pipe.

Next, a light source was arranged for photoirradiation of the near-field light two-dimensional array.

According to the above process, a near-field light microreactor of Example 6 was produced.

Confirmation of Photochemical Reaction in Near-Field Light Microreactor

Next, photochemical reaction was confirmed in the near-field light microreactor.

As the material, used was hexafluorodiarylethene.

Figure 20:
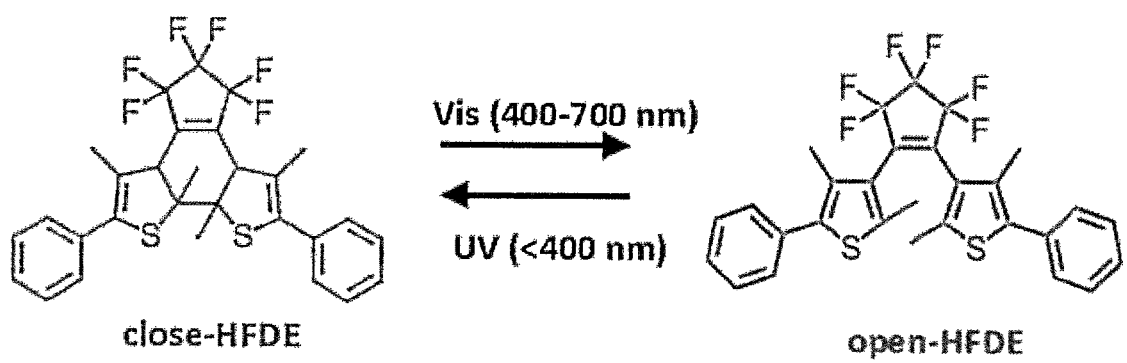
FIG. 20 is a view showing photochemical reaction of HFDE.

FIG. 20 shows photochemical reaction of hexafluorodiarylethene.

As shown in FIG. 20, hexafluorodiarylethene in a closed state (hereinafter referred to as close-HFDE) generally undergoes photochemical reaction when irradiated with visible light falling from 400 to 700 nm to change to hexafluorodiarylethene in an open state (hereinafter referred to as open-HFDE). The open-HFDE generally undergoes photochemical reaction when irradiated with UV light of at most 400 nm to change to close-HFDE.

First, a dispersion prepared by dispersing close-HFDE in a solvent was put into the chemical bottle in the near-field light microreactor of Example 6.

Figure 21:
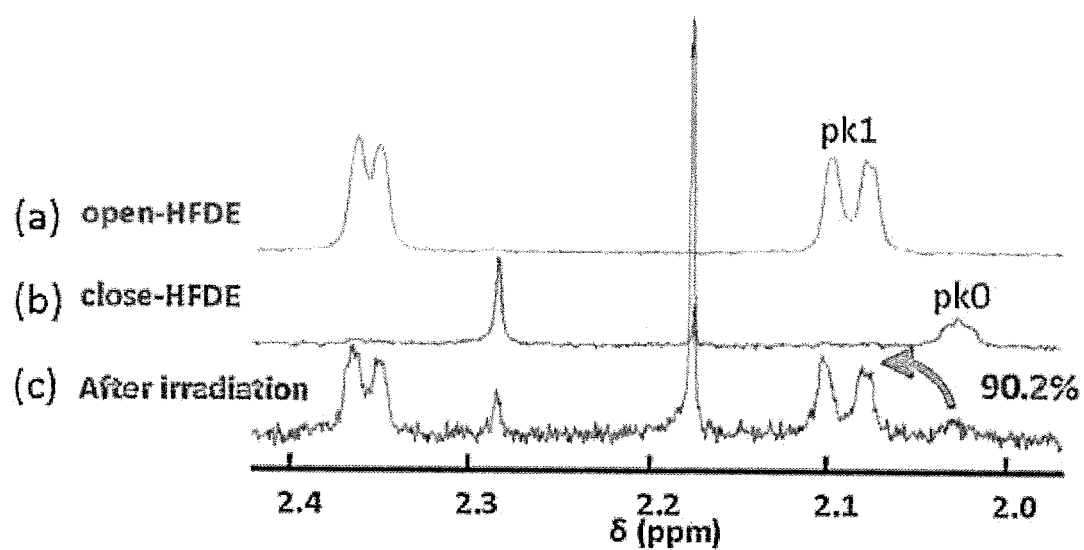
FIG. 21 shows NMR spectra of open-HFDE, close-HFDE and reaction product.

Next, from the light source, the near-field light two-dimensional array was irradiated with a light source having a wavelength dispersion of 30 Dod-SAM shown in FIG. 21.

At the same time, the dispersion was sucked through the syringe pump. The flow rate was about 0.06 mL/min.

Next, the dispersion in the syringe pump was analyzed to identify the chemical substances contained in the dispersion.

FIG. 21 shows NMR spectra. FIG. 21(a) is the NMR spectrum of open-HFDE; FIG. 21(b) is the NMR spectrum of the reaction product (close-HFDE) in the dispersion before photoirradiation; and FIG. 21(c) is the NMR spectrum of the product in the dispersion after photoirradiation.

90.2% of close-HFDE was converted into open-HFDE.

Figure 22:
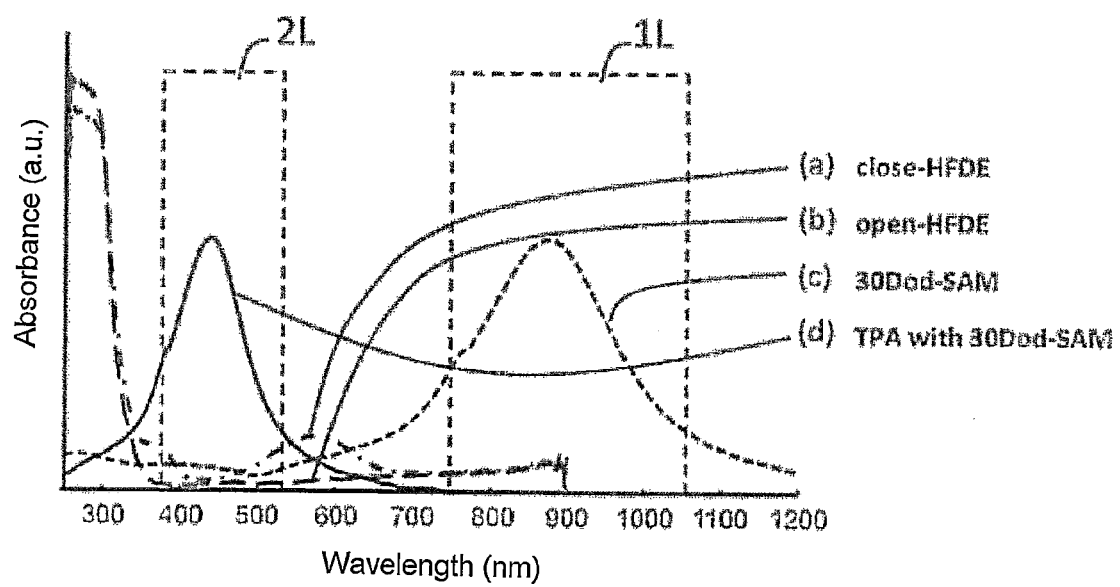
FIG. 22 shows absorption spectra of HFDE and extinction spectra of gold nanoparticle arrays.
Figure 24:
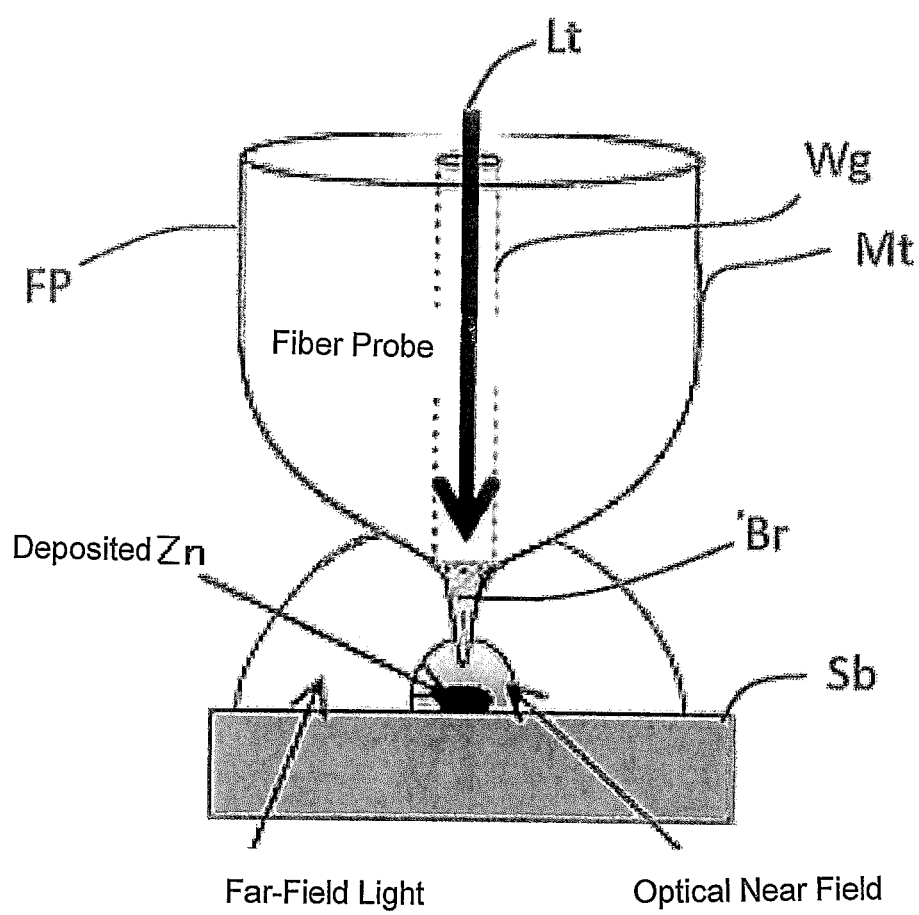
FIG. 24 is a view showing an existing case.
Figure 25:
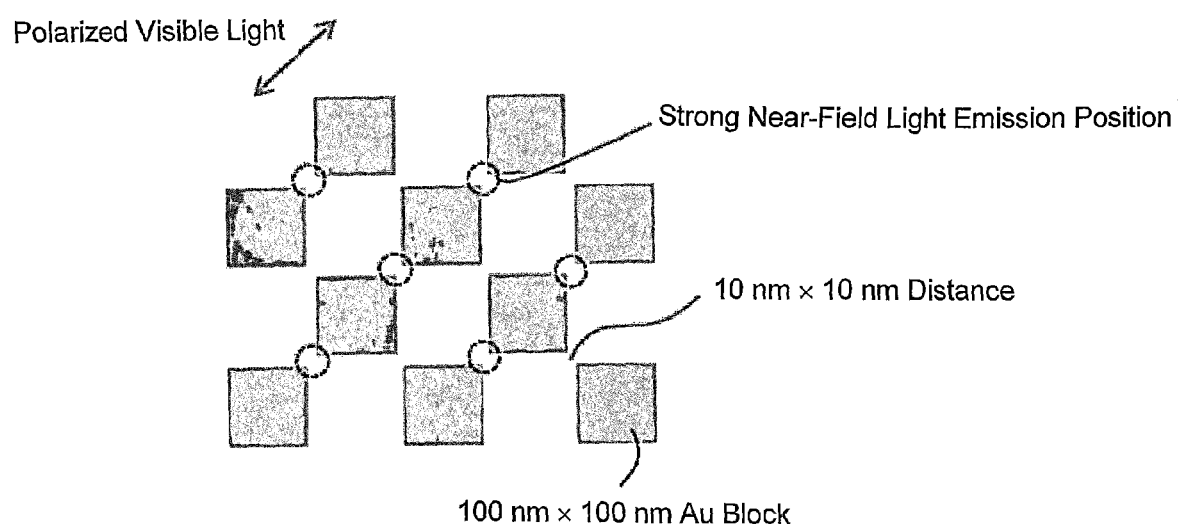
FIG. 25 is a view showing another existing case.

FIG. 22 shows absorption spectra of hexafluorodiarylethene (HFDE). FIG. 22(a) is the absorption spectrum of close-HFDE; FIG. 22(b) is the absorption spectrum of open-HFDE; FIG. 22(c) is the absorption spectrum (extinction spectrum) of the array where the gold nanoparticles having a particle size of 30 nm were self-organized (hereinafter referred to as 30 Dod-SAM): and FIG. 22(d) is the spectrum of the near-field light in two photon excitation (hereinafter referred to as TPA with 30 Dod-SAM).

In this, the wavelength region (740 to 1050 nm) of the light for irradiation to 30 Dod-SAM is indicated by 1 L. The wavelength region (380 to 530 nm) of the near-field light in two photon excitation having occurred through photoirradiation in the wavelength range of 1 L is indicated by 2 L.

As shown in FIG. 22, the irradiation region with the near-field light based on the two photon excitation wavelength overlaps with the absorption wavelength of close-HFDE in the wavelength region of from 450 nm to 560 nm, and therefore, it is considered that the two photon reaction would have resulted from the strong near-field light generated by the gold nanoparticle two-dimensional array.

This verifies efficient photochemical reaction attained by the near-field light in the near-field light microreactor of Example 6.

Example 7

Next, a near-field light microchannel structure shown in FIG. 10 was produced.

PDMS was used as the transparent substrate. According to an in-print method, the length and the size of the microchannel and the hole were varied to produce the sample. FIG. 23 shows the condition of the microchannel produced here.

Next, like in Example 1, a near-field light two-dimensional array was formed on a flat glass substrate.

Next, the glass substrate with the near-field light two-dimensional array formed thereon was bonded to the transparent substrate to construct a near-field light microchannel structure. Using this and in the same manner as in Example 6, a near-field light microreactor was produced.

Example 8

Next, a near-field light microreactor shown in FIG. 11 was produced.

First, PDMS was used as a transparent substrate; and a microchannel and holes were formed according to an in-print method.

Next, holes were formed in the PDMS substrate according to an in-print method, then a gold thin film was formed on the entire surface of the substrate, a immobilizing layer was formed, and in the same manner as in Example 1, metal nanoparticle arrays were formed to construct a near-field light microchannel structure.

Next, as a transparent substrate, PDMS was used, and a microchannel was formed according to an in-print method.

Next, the substrates were bonded together in such a manner that the microchannel could pass to the holes.

Next, pipes were connected to the holes, and were connected to a chemical bottle and a syringe pump, and a light source was fitted to the structure to construct a near-field light microreactor.

The near-field light two-dimensional array was kept photoirradiated, and from the chemical bottle containing a reaction solution prepared by dissolving a reactive chemical substance in a solvent, the reaction solution was poured into the microreactor, and was collected via the syringe pump. The photochemical reaction in the microreactor was confirmed.

Example 9

A near-field light microchannel structure shown in FIG. 12 was produced.

The near-field light microchannel structure was produced in the same manner as in Example 5 except that four holes were formed and branched microchannels were formed.

Next, four pipes were connected to the holes, and were connected to a chemical bottle and a syringe pump, and a light source was fitted to the structure to construct a near-field light microreactor of Example 9.

Confirmation of Photochemical Reaction in Near-Field Light Microreactor

The near-field light two-dimensional array was photoirradiated with an external light source. Kept in the state, the microreactor was processed according to a series of the process mentioned below.

First, while a solution prepared by dissolving an aldehyde compound was kept injected through a solution supply port, a solution prepared by dissolving an amine compound was injected through another solution supply port.

Next, an aromatic or aliphatic halide was injected through still another solution supply port.

From the reaction solution discharge port, a hydroxylamine compound was obtained as a tandem photoreaction product.

Accordingly, it was presumed that dehydrating condensation went on through mixing in the first joint part to produce an imine compound, and thereafter the imine compound was mixed with the halogen compound in the second joint part, and further on the near-field light two-dimensional array, photo-excited radical production reaction from the halide compound was induced whereby the reaction with the alkyl radical imine compound and the subsequent radical stopping reaction with water in the system were attained.

Example 10

A near-field light microchannel structure shown in FIG. 13 was produced.

The near-field light microchannel structure was produced in the same manner as in Example 9 except that the near-field light two-dimensional array was arranged between the joint parts in the former so that the two structures could differ in point of the site for photochemical reaction therein.

Confirmation of Photochemical Reaction in Near-Field Light Microreactor

The near-field light two-dimensional array was photoirradiated with an external light source. Kept in the state, the microreactor was processed according to a series of the process mentioned below.

First, while a solution prepared by dissolving an aromatic or aliphatic halide was kept injected through a solution supply port, a solution prepared by dissolving an α,β-unsaturated carboxylic acid compound was injected through another solution supply port.

Next, a solution prepared by dissolving an amine compound was injected through still another solution supply port.

From the reaction solution discharge port, an amide compound was obtained as a tandem photoreaction product.

Accordingly, it was presumed that the solution prepared by mixing in the first joint part was converted into a carboxylic acid in the second joint part, and thereafter the acid was amidated.

INDUSTRIAL APPLICABILITY

The near-field light microchannel structure and the near-field light microreactor of the invention enable any desired combination of photochemical reaction and ordinary chemical reaction in the microchannel therein, and are usable for various types of chemical syntheses, chemical analyses, etc. Accordingly, the industrial applicability of the invention broadly covers a chemical synthesis industry, a chemical analysis industry, etc.

The invention claimed is:

1. A near-field light microchannel structure that comprises a structure provided with a microchannel and a near-field light two-dimensional array arranged inside the microchannel and configured to enable in-plane near-field light generating upon photoirradiating;
   wherein the near-field light two-dimensional array comprises an electroconductive layer formed on an inner wall surface of the microchannel, an immobilizing layer immobilized on a first surface of the electroconductive layer via chemical bonding, and metal nanoparticle arrays immobilized on a first surface of the immobilizing layer via chemical bonding, and
   wherein the metal nanoparticle arrays each comprise multiple metal nanoparticles arrayed at regular intervals and bonded to each other via a modifying part arranged on the surface of the immobilizing layer.

2. The near-field light microchannel structure as claimed in claim 1, wherein the structure has a first member and a second member laminated on a first surface of the first member, and the microchannel is arranged between the first member and the second member.

3. The near-field light microchannel structure as claimed in claim 2, wherein a first hole to pass to the microchannel is formed in a first surface of the second member.

4. The near-field light microchannel structure as claimed in claim 3, wherein a second hole to pass to the microchannel is formed in the first surface of the second member.

5. The near-field light microchannel structure as claimed in claim 4, wherein a third hole to pass to the microchannel is formed in the first member.

6. The near-field light microchannel structure as claimed in claim 5, wherein the third hole communicates with another microchannel arranged between a third member laminated on a second surface of the first member, and the first member.

7. The near-field light microchannel structure as claimed in claim 6, wherein a fourth hole to pass to the other microchannel is formed in the first member.

8. A near-field light microreactor comprising:
   the near-field light microchannel structure of claim 4,
   a reaction solution supply for feeding a reaction solution to the microchannel,
   a pump for sucking the reaction solution in the microchannel, and
   a light source for photoirradiating the near-field light two-dimensional array in the microchannel.

9. The near-field light microreactor as claimed in claim 8, wherein the reaction solution supply is connected to the first hole.

10. The near-field light microreactor as claimed in claim 8, wherein the pump is connected to the second hole.

11. The near-field light microchannel structure as claimed in claim 2, wherein at least two first holes are formed in a surface of the second member, and a first microchannel to linearly connect any one of the first holes and a second hole, and a branched microchannel as branched from the first microchannel via a joint part and passing to each of the first holes are arranged.

12. The near-field light microchannel structure as claimed in claim 11, wherein two or more branched microchannels are formed, and the near-field light two-dimensional array is arranged on a side of the second hole opposite to any joint part in the first microchannel.

13. The near-field light microchannel structure as claimed in claim 11, wherein two or more branched microchannels are formed, and the near-field light two-dimensional array is arranged between the joint parts of the adjacent branched microchannels in the first microchannel.

14. The near-field light microchannel structure as claimed in claim 1, wherein the interval between the metal nanoparticles is from 1 to 10 nm.

15. The near-field light microchannel structure as claimed in claim 1, wherein the particle size of the metal nanoparticles is from 1 to 100 nm.

16. The near-field light microchannel structure as claimed in claim 1, wherein the metal nanoparticles are formed of gold.

17. The near-field light microchannel structure as claimed in claim 1, wherein the modifying part is an organic molecule having a thiol group, and the thiol group is bonded to the metal nanoparticles.

18. The near-field light microchannel structure as claimed in claim 17, wherein the organic molecule of the modifying part has an alkyl chain with from 6 to 20 carbon atoms.

19. The near-field light microchannel structure as claimed in claim 1, wherein the immobilizing layer comprises an organic molecule having at least two thiol groups, at least one thiol group is arranged on both the first surface and a second surface of the immobilizing layer, and the thiol group on the second surface of the immobilizing layer is bonded to the electroconductive layer.

20. The near-field light microchannel structure as claimed in claim 19, wherein the organic molecule to constitute the immobilizing layer has an alkyl chain with from 6 to 20 carbon atoms.

21. The near-field light microchannel structure as claimed in claim 1, wherein the microchannel is formed to have a bended part or a folded part or both the bended part and the folded part.

22. The near-field light microchannel structure as claimed in claim 1, wherein multiple microchannels are arranged.

* * * * *